(12) United States Patent
Itoi

(10) Patent No.: US 6,827,276 B2
(45) Date of Patent: Dec. 7, 2004

(54) DATA RECORDING AND REPRODUCING METHOD AND APPARATUS CAPABLE OF RECOMPRESSING INDIVIDUAL DATA BLOCKS

(75) Inventor: Satoshi Itoi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/359,659

(22) Filed: Feb. 7, 2003

(65) Prior Publication Data

US 2003/0154344 A1 Aug. 14, 2003

(30) Foreign Application Priority Data

Feb. 8, 2002 (JP) ........................................ 2002-032466

(51) Int. Cl.[7] .............................................. G06K 19/00
(52) U.S. Cl. ...................................... 235/487; 369/52.1
(58) Field of Search ................................. 235/487, 375, 235/454, 493, 494; 369/52.1, 44.29

(56) References Cited

U.S. PATENT DOCUMENTS

| | | | |
|---|---|---|---|
| 5,241,434 A | * | 8/1993 | Okamoto et al. ........ 360/77.14 |
| 5,959,280 A | * | 9/1999 | Kamatani .................... 235/454 |
| 6,009,227 A | * | 12/1999 | Inoue ............................ 386/52 |
| 6,129,283 A | * | 10/2000 | Imade et al. ................ 235/494 |
| 6,157,773 A | * | 12/2000 | Yamagishi ................... 386/109 |

FOREIGN PATENT DOCUMENTS

| | | |
|---|---|---|
| JP | 59-060666 | 4/1984 |
| JP | 10-271498 | 10/1998 |
| JP | 2000-066873 | 3/2000 |
| JP | 2000-089983 | 3/2000 |
| JP | 2000-322291 | 11/2000 |
| JP | 2001-231009 | 8/2001 |

* cited by examiner

*Primary Examiner*—Daniel StCyr
(74) *Attorney, Agent, or Firm*—McGinn & Gibb, PLLC

(57) ABSTRACT

In a data recording and reproducing method, data blocks are recorded in a storage unit. Priority levels each for one of the data blocks are set and stored. It is determined whether or not a vacant area of the storage unit is expected to be short. When the vacant area of the storage unit is expected to be short. The data blocks recorded in the storage unit are recompressed in accordance with the stored priority levels.

50 Claims, 41 Drawing Sheets

Fig. 2

| | |
|---|---|
| N | DATA BLOCK NUMBER |
| ADD | START SECTOR ADDRESS |
| NS | NUMBER OF SECTORS |
| R | COMPRESSION BIT RATE |
| FXM | RECOMPRESSION PERMITTING FLAG |
| FXH | RECOMPRESSION PROHIBITING FLAG |
| FXE | ERASE PERMITTING FLAG |

Fig. 3

| PRIORITY LEVEL | FXM | FXH | FXE |
|---|---|---|---|
| 1 | − | − | "1" |
| 2 | "1" | "0" | "0" |
| 3 | "0" | "0" | "0" |
| 4 | "0" | "1" | "0" |

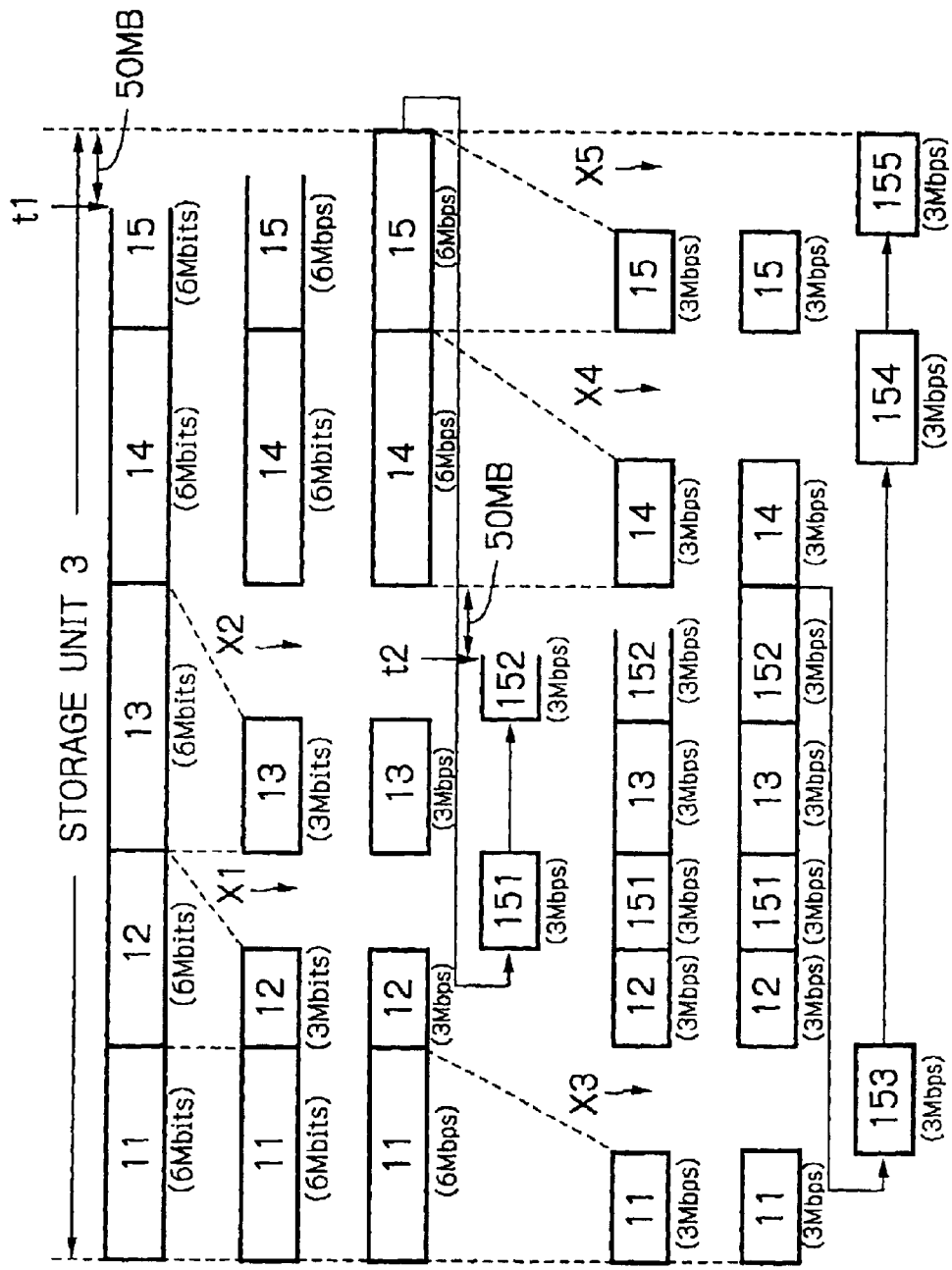

Fig. 7A

| N | 11 | | N | 12 | | N | 13 | | N | 14 | | N | 15 |
|---|---|---|---|---|---|---|---|---|---|---|---|---|---|
| ADD | ... | | ADD | ... | | ADD | ... | | ADD | ... | | ADD | ... |
| NS | ... | | NS | ... | | NS | ... | | NS | ... | | NS | ... |
| R | 6Mbps | | R | 6Mbps | | R | 6Mbps | | R | 6Mbps | | R | 6Mbps |
| FXM | "0" | | FXM | "1" | | FXM | "1" | | FXM | "0" | | FXM | "0" |
| FXH | "0" | | FXH | "0" | | FXH | "0" | | FXH | "0" | | FXH | "0" |
| FXE | "0" | | FXE | "0" | | FXE | "0" | | FXE | "0" | | FXE | "0" |

Fig. 7B

| N | 11 | | N | 12 | | N | 13 | | N | 14 | | N | 15 |
|---|---|---|---|---|---|---|---|---|---|---|---|---|---|
| ADD | ... | | ADD | ... | | ADD | ... | | ADD | ... | | ADD | ... |
| NS | ... | | NS | ... | | NS | ... | | NS | ... | | NS | ... |
| R | 6Mbps | | R | 3Mbps | | R | 3Mbps | | R | 6Mbps | | R | 6Mbps |
| FXM | "0" | | FXM | "1" | | FXM | "1" | | FXM | "0" | | FXM | "0" |
| FXH | "0" | | FXH | "0" | | FXH | "0" | | FXH | "0" | | FXH | "0" |
| FXE | "0" | | FXE | "0" | | FXE | "0" | | FXE | "0" | | FXE | "0" |

Fig. 7C

| N | 11 | | N | 12 | | N | 13 | | N | 14 | | N | 15 |
|---|---|---|---|---|---|---|---|---|---|---|---|---|---|
| ADD | ... | | ADD | ... | | ADD | ... | | ADD | ... | | ADD | ... |
| NS | ... | | NS | ... | | NS | ... | | NS | ... | | NS | ... |
| R | 6Mbps | | R | 3Mbps | | R | 3Mbps | | R | 6Mbps | | R | 6Mbps |
| FXM | "0" | | FXM | "1" | | FXM | "1" | | FXM | "0" | | FXM | "0" |
| FXH | "0" | | FXH | "0" | | FXH | "0" | | FXH | "0" | | FXH | "0" |
| FXE | "0" | | FXE | "0" | | FXE | "0" | | FXE | "0" | | FXE | "0" |

| N | 151 | | N | 152 |
|---|---|---|---|---|
| ADD | ... | | ADD | ... |
| NS | ... | | NS | ... |
| R | 3Mbps | | R | 3Mbps |
| FXM | "0" | | FXM | "0" |
| FXH | "0" | | FXH | "0" |
| FXE | "0" | | FXE | "0" |

Fig. 7D

| | N | 11 | | N | 12 | | N | 13 | | N | 14 | | N | 15 |
|---|---|---|---|---|---|---|---|---|---|---|---|---|---|---|
| | ADD | ... | | ADD | ... | | ADD | ... | | ADD | ... | | ADD | ... |
| | NS | ... | | NS | ... | | NS | ... | | NS | ... | | NS | ... |
| | R | 3Mbps | | R | 3Mbps | | R | 3Mbps | | R | 3Mbps | | R | 3Mbps |
| | FXM | "0" | | FXM | "1" | | FXM | "1" | | FXM | "0" | | FXM | "0" |
| | FXH | "0" | | FXH | "0" | | FXH | "0" | | FXH | "0" | | FXH | "0" |
| | FXE | "0" | | FXE | "0" | | FXE | "0" | | FXE | "0" | | FXE | "0" |

| | N | 151 | | N | 152 |
|---|---|---|---|---|---|
| | ADD | ... | | ADD | ... |
| | NS | ... | | NS | ... |
| | R | 3Mbps | | R | 3Mbps |
| | FXM | "0" | | FXM | "0" |
| | FXH | "0" | | FXH | "0" |
| | FXE | "0" | | FXE | "0" |

Fig. 7E

| | N | 11 | | N | 12 | | N | 13 | | N | 14 | | N | 15 |
|---|---|---|---|---|---|---|---|---|---|---|---|---|---|---|
| | ADD | ... | | ADD | ... | | ADD | ... | | ADD | ... | | ADD | ... |
| | NS | ... | | NS | ... | | NS | ... | | NS | ... | | NS | ... |
| | R | 3Mbps | | R | 3Mbps | | R | 3Mbps | | R | 3Mbps | | R | 3Mbps |
| | FXM | "0" | | FXM | "1" | | FXM | "1" | | FXM | "0" | | FXM | "0" |
| | FXH | "0" | | FXH | "0" | | FXH | "0" | | FXH | "0" | | FXH | "0" |
| | FXE | "0" | | FXE | "0" | | FXE | "0" | | FXE | "0" | | FXE | "0" |

| | N | 151 | | N | 152 | | N | 153 | | N | 154 | | N | 155 |
|---|---|---|---|---|---|---|---|---|---|---|---|---|---|---|
| | ADD | ... | | ADD | ... | | ADD | ... | | ADD | ... | | ADD | ... |
| | NS | ... | | NS | ... | | NS | ... | | NS | ... | | NS | ... |
| | R | 3Mbps | | R | 3Mbps | | R | 3Mbps | | R | 3Mbps | | R | 3Mbps |
| | FXM | "0" | | FXM | "0" | | FXM | "0" | | FXM | "0" | | FXM | "0" |
| | FXH | "0" | | FXH | "0" | | FXH | "0" | | FXH | "0" | | FXH | "0" |
| | FXE | "0" | | FXE | "0" | | FXE | "0" | | FXE | "0" | | FXE | "0" |

Fig. 8

| | |
|---|---|
| N | DATA BLOCK NUMBER |
| ADD | START SECTOR ADDRESS |
| NS | NUMBER OF SECTORS |
| R | COMPRESSION BIT RATE |
| FXS | RECOMPRESSION SEQUENCE FLAG |
| FXH | RECOMPRESSION PROHIBITING FLAG |
| FXE | ERASE PERMITTING FLAG |

Fig. 9

| PRIORITY LEVEL | FXS | FXH | FXE |
|---|---|---|---|
| 1 | — | — | "1" |
| 2 | "1" | "0" | "0" |
| 3 | "2" | "0" | "0" |
| 4 | "3" | "0" | "0" |
| 5 | "4" | "0" | "0" |
| 6 | "5" | "0" | "0" |
| 7 | "0" | "1" | "0" |

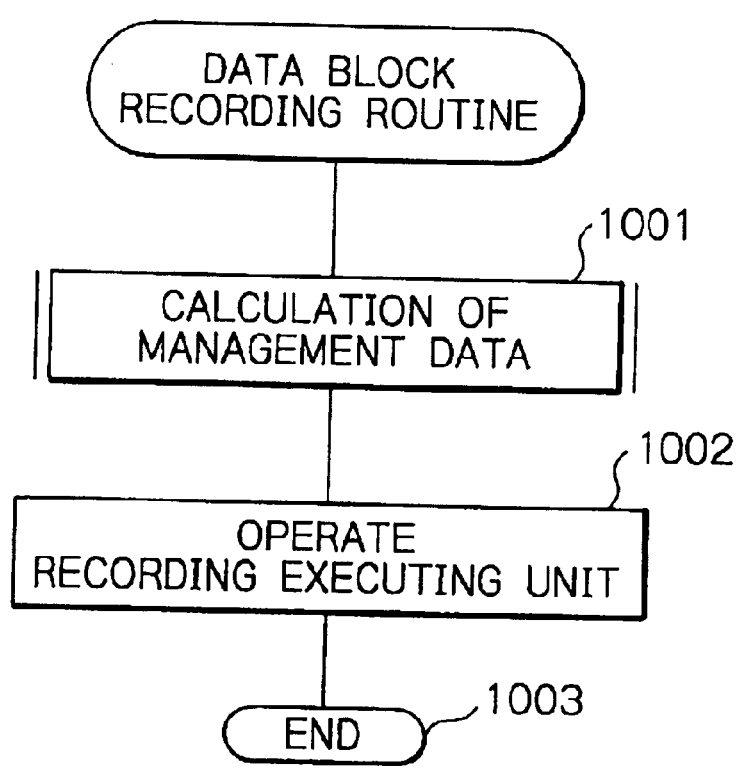

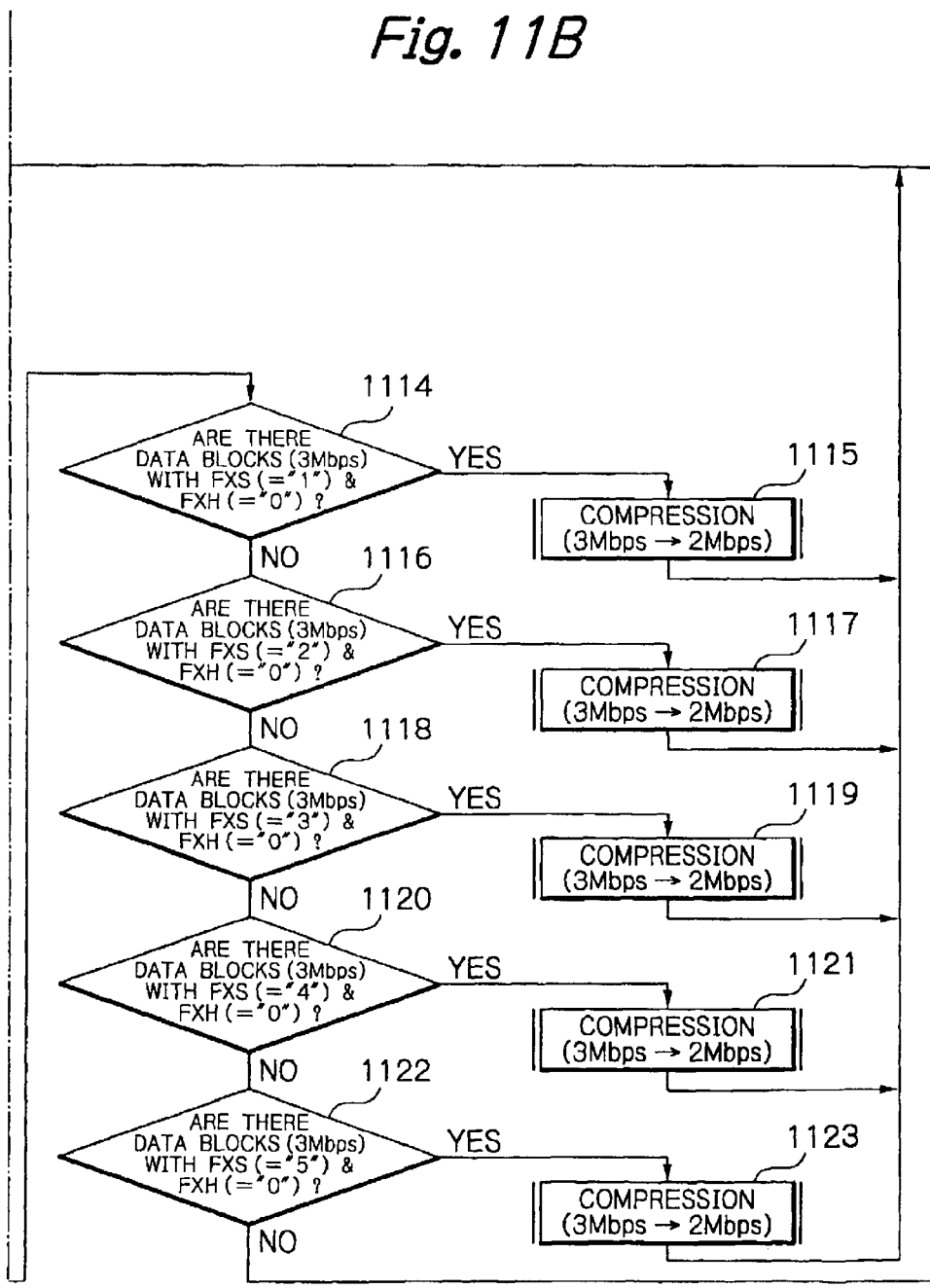

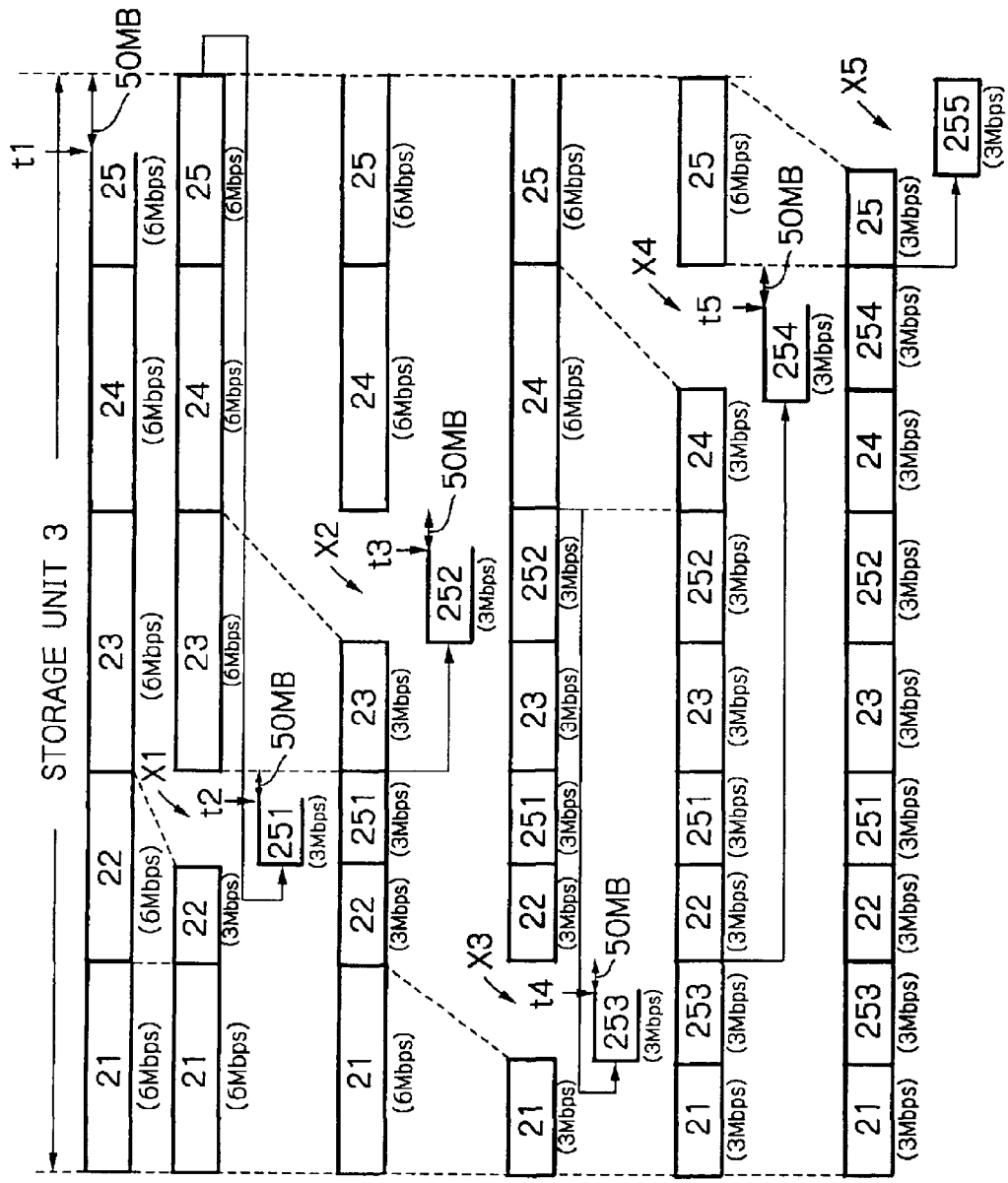

Fig. 13A

| N | 21 | N | 22 | N | 23 | N | 24 | N | 24 |
|---|---|---|---|---|---|---|---|---|---|
| ADD | ... | ADD | ... | ADD | ... | ADD | ... | ADD | ... |
| NS | ... | NS | ... | NS | ... | NS | ... | NS | ... |
| R | 6Mbps | R | 6Mbps | R | 6Mbps | R | 6Mbps | R | 6Mbps |
| FXS | "3" | FXS | "1" | FXS | "2" | FXS | "4" | FXS | "5" |
| FXH | "0" | FXH | "0" | FXH | "0" | FXH | "0" | FXH | "0" |
| FXE | "0" | FXE | "0" | FXE | "0" | FXE | "0" | FXE | "0" |

Fig. 13B

| N | 21 | N | 22 | N | 23 | N | 24 | N | 25 |
|---|---|---|---|---|---|---|---|---|---|
| ADD | ... | ADD | ... | ADD | ... | ADD | ... | ADD | ... |
| NS | ... | NS | ... | NS | ... | NS | ... | NS | ... |
| R | 6Mbps | R | 3Mbps | R | 6Mbps | R | 6Mbps | R | 6Mbps |
| FXS | "3" | FXS | "1" | FXS | "2" | FXS | "4" | FXS | "5" |
| FXH | "0" | FXH | "0" | FXH | "0" | FXH | "0" | FXH | "0" |
| FXE | "0" | FXE | "0" | FXE | "0" | FXE | "0" | FXE | "0" |

| N | 251 |
|---|---|
| ADD | ... |
| NS | ... |
| R | 3Mbps |
| FXS | "5" |
| FXH | "0" |
| FXE | "0" |

Fig. 13C

| N | 21 | N | 22 | N | 23 | N | 24 | N | 25 |
|---|---|---|---|---|---|---|---|---|---|
| ADD | ... | ADD | ... | ADD | ... | ADD | ... | ADD | ... |
| NS | ... | NS | ... | NS | ... | NS | ... | NS | ... |
| R | 6Mbps | R | 3Mbps | R | 3Mbps | R | 6Mbps | R | 6Mbps |
| FXS | "3" | FXS | "1" | FXS | "2" | FXS | "4" | FXS | "5" |
| FXH | "0" | FXH | "0" | FXH | "0" | FXH | "0" | FXH | "0" |
| FXE | "0" | FXE | "0" | FXE | "0" | FXE | "0" | FXE | "0" |

| N | 251 | N | 252 |
|---|---|---|---|
| ADD | ... | ADD | ... |
| NS | ... | NS | ... |
| R | 3Mbps | R | 3Mbps |
| FXS | "5" | FXS | "5" |
| FXH | "0" | FXH | "0" |
| FXE | "0" | FXE | "0" |

Fig. 13D

| N | 21 | | N | 22 | | N | 23 | | N | 24 | | N | 25 |
|---|---|---|---|---|---|---|---|---|---|---|---|---|---|
| ADD | ... | | ADD | ... | | ADD | ... | | ADD | ... | | ADD | ... |
| NS | ... | | NS | ... | | NS | ... | | NS | ... | | NS | ... |
| R | 3Mbps | | R | 3Mbps | | R | 3Mbps | | R | 6Mbps | | R | 6Mbps |
| FXS | "3" | | FXS | "1" | | FXS | "2" | | FXS | "4" | | FXS | "5" |
| FXH | "0" | | FXH | "0" | | FXH | "0" | | FXH | "0" | | FXH | "0" |
| FXE | "0" | | FXE | "0" | | FXE | "0" | | FXE | "0" | | FXE | "0" |

| N | 251 | | N | 252 | | N | 253 |
|---|---|---|---|---|---|---|---|
| ADD | ... | | ADD | ... | | ADD | ... |
| NS | ... | | NS | ... | | NS | ... |
| R | 3Mbps | | R | 3Mbps | | R | 3Mbps |
| FXS | "5" | | FXS | "5" | | FXS | "5" |
| FXH | "0" | | FXH | "0" | | FXH | "0" |
| FXE | "0" | | FXE | "0" | | FXE | "0" |

Fig. 13E

| N | 21 | | N | 22 | | N | 23 | | N | 24 | | N | 25 |
|---|---|---|---|---|---|---|---|---|---|---|---|---|---|
| ADD | ... | | ADD | ... | | ADD | ... | | ADD | ... | | ADD | ... |
| NS | ... | | NS | ... | | NS | ... | | NS | ... | | NS | ... |
| R | 3Mbps | | R | 3Mbps | | R | 3Mbps | | R | 3Mbps | | R | 6Mbps |
| FXS | "3" | | FXS | "1" | | FXS | "2" | | FXS | "4" | | FXS | "5" |
| FXH | "0" | | FXH | "0" | | FXH | "0" | | FXH | "0" | | FXH | "0" |
| FXE | "0" | | FXE | "0" | | FXE | "0" | | FXE | "0" | | FXE | "0" |

| N | 251 | | N | 252 | | N | 253 | | N | 254 |
|---|---|---|---|---|---|---|---|---|---|---|
| ADD | ... | | ADD | ... | | ADD | ... | | ADD | ... |
| NS | ... | | NS | ... | | NS | ... | | NS | ... |
| R | 3Mbps | | R | 3Mbps | | R | 3Mbps | | R | 3Mbps |
| FXS | "5" | | FXS | "5" | | FXS | "5" | | FXS | "5" |
| FXH | "0" | | FXH | "0" | | FXH | "0" | | FXH | "0" |
| FXE | "0" | | FXE | "0" | | FXE | "0" | | FXE | "0" |

Fig. 13F

| N | 21 |
|---|---|
| ADD | ... |
| NS | ... |
| R | 3Mbps |
| FXS | "3" |
| FXH | "0" |
| FXE | "0" |

| N | 22 |
|---|---|
| ADD | ... |
| NS | ... |
| R | 3Mbps |
| FXS | "1" |
| FXH | "0" |
| FXE | "0" |

| N | 23 |
|---|---|
| ADD | ... |
| NS | ... |
| R | 3Mbps |
| FXS | "2" |
| FXH | "0" |
| FXE | "0" |

| N | 24 |
|---|---|
| ADD | ... |
| NS | ... |
| R | 3Mbps |
| FXS | "4" |
| FXH | "0" |
| FXE | "0" |

| N | 25 |
|---|---|
| ADD | ... |
| NS | ... |
| R | 3Mbps |
| FXS | "5" |
| FXH | "0" |
| FXE | "0" |

| N | 251 |
|---|---|
| ADD | ... |
| NS | ... |
| R | 3Mbps |
| FXS | "5" |
| FXH | "0" |
| FXE | "0" |

| N | 252 |
|---|---|
| ADD | ... |
| NS | ... |
| R | 3Mbps |
| FXS | "5" |
| FXH | "0" |
| FXE | "0" |

| N | 253 |
|---|---|
| ADD | ... |
| NS | ... |
| R | 3Mbps |
| FXS | "5" |
| FXH | "0" |
| FXE | "0" |

| N | 254 |
|---|---|
| ADD | ... |
| NS | ... |
| R | 3Mbps |
| FXS | "5" |
| FXH | "0" |
| FXE | "0" |

| N | 255 |
|---|---|
| ADD | ... |
| NS | ... |
| R | 3Mbps |
| FXS | "5" |
| FXH | "0" |
| FXE | "0" |

Fig. 14

| | |
|---|---|
| N | DATA BLOCK NUMBER |
| ADD | START SECTOR ADDRESS |
| NS | NUMBER OF SECTORS |
| R | COMPRESSION BIT RATE |
| FXS | RECOMPRESSION SEQUENCE FLAG |
| FXH | RECOMPRESSION PROHIBITING FLAG |
| FXE | ERASE PERMITTING FLAG |

Fig. 15

| PRIORITY LEVEL | FXS | FXH | FXE |
|---|---|---|---|
| 1 | – | – | "1" |
| 2 | "1" | "0" | "0" |
| 3 | "2" | "0" | "0" |
| 4 | "3" | "0" | "0" |
| 5 | "4" | "0" | "0" |
| 6 | "0" | "1" | "0" |

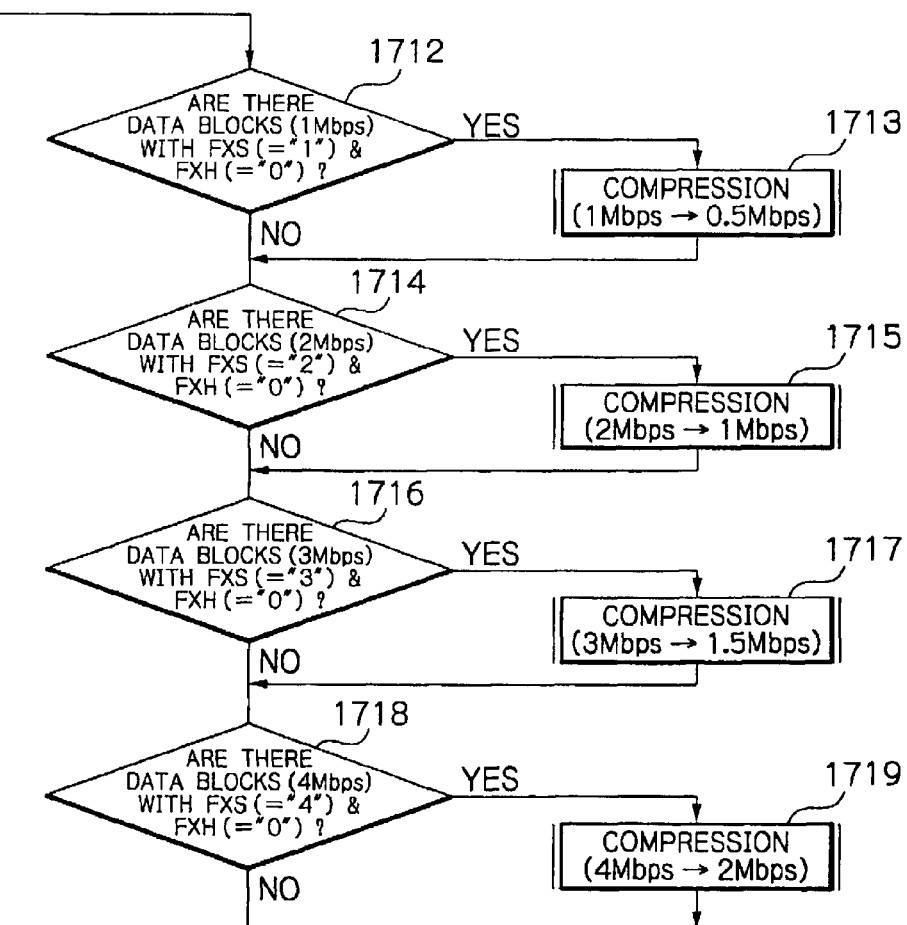

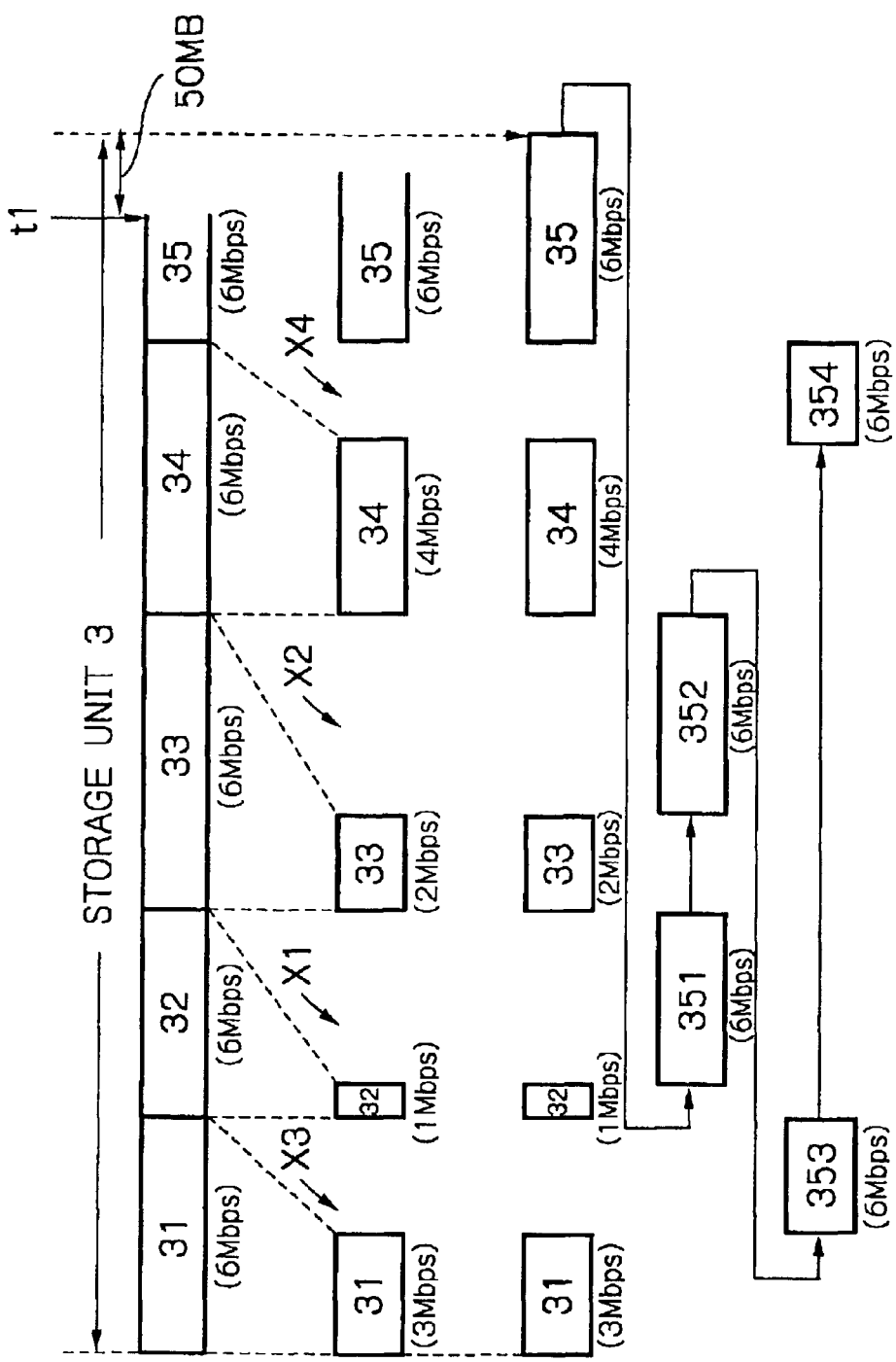

Fig. 19A

| N | 31 | | N | 32 | | N | 33 | | N | 34 | | N | 35 |
|---|---|---|---|---|---|---|---|---|---|---|---|---|---|
| ADD | ... | | ADD | ... | | ADD | ... | | ADD | ... | | ADD | ... |
| NS | ... | | NS | ... | | NS | ... | | NS | ... | | NS | ... |
| R | 6Mbps | | R | 6Mbps | | R | 6Mbps | | R | 6Mbps | | R | 6Mbps |
| FXS | "3" | | FXS | "1" | | FXS | "2" | | FXS | "4" | | FXS | "0" |
| FXH | "0" | | FXH | "0" | | FXH | "0" | | FXH | "0" | | FXH | "1" |
| FXE | "0" | | FXE | "0" | | FXE | "0" | | FXE | "0" | | FXE | "0" |

Fig. 19B

| N | 31 | | N | 32 | | N | 33 | | N | 34 | | N | 35 |
|---|---|---|---|---|---|---|---|---|---|---|---|---|---|
| ADD | ... | | ADD | ... | | ADD | ... | | ADD | ... | | ADD | ... |
| NS | ... | | NS | ... | | NS | ... | | NS | ... | | NS | ... |
| R | 3Mbps | | R | 1Mbps | | R | 2Mbps | | R | 4Mbps | | R | 6Mbps |
| FXS | "3" | | FXS | "1" | | FXS | "2" | | FXS | "4" | | FXS | "0" |
| FXH | "0" | | FXH | "0" | | FXH | "0" | | FXH | "0" | | FXH | "1" |
| FXE | "0" | | FXE | "0" | | FXE | "0" | | FXE | "0" | | FXE | "0" |

Fig. 19C

| N | 31 | | N | 32 | | N | 33 | | N | 34 | | N | 35 |
|---|---|---|---|---|---|---|---|---|---|---|---|---|---|
| ADD | ... | | ADD | ... | | ADD | ... | | ADD | ... | | ADD | ... |
| NS | ... | | NS | ... | | NS | ... | | NS | ... | | NS | ... |
| R | 3Mbps | | R | 1Mbps | | R | 2Mbps | | R | 4Mbps | | R | 6Mbps |
| FXS | "3" | | FXS | "1" | | FXS | "2" | | FXS | "4" | | FXS | "0" |
| FXH | "0" | | FXH | "0" | | FXH | "0" | | FXH | "0" | | FXH | "1" |
| FXE | "0" | | FXE | "0" | | FXE | "0" | | FXE | "0" | | FXE | "0" |

| N | 351 | | N | 352 | | N | 351 | | N | 354 |
|---|---|---|---|---|---|---|---|---|---|---|
| ADD | ... | | ADD | ... | | ADD | ... | | ADD | ... |
| NS | ... | | NS | ... | | NS | ... | | NS | ... |
| R | 6Mbps | | R | 6Mbps | | R | 6Mbps | | R | 6Mbps |
| FXS | "0" | | FXS | "0" | | FXS | "0" | | FXS | "0" |
| FXH | "1" | | FXH | "1" | | FXH | "1" | | FXH | "1" |
| FXE | "0" | | FXE | "0" | | FXE | "0" | | FXE | "0" |

Fig. 20

| | |
|---|---|
| N | DATA BLOCK NUMBER |
| ADD | START SECTOR ADDRESS |
| NS | NUMBER OF SECTORS |
| R | COMPRESSION BIT RATE |
| FXS | RECOMPRESSION SEQUENCE FLAG |
| FXH | RECOMPRESSION PROHIBITING FLAG |
| FXE | ERASE PERMITTING FLAG |

Fig. 21

| PRIORITY LEVEL | FXS | FXH | FXE |
|---|---|---|---|
| 1 | – | – | "1" |
| 2 | "1" | "0" | "0" |
| 3 | "2" | "0" | "0" |
| 4 | "3" | "0" | "0" |
| 5 | "4" | "0" | "0" |
| 6 | "5" | "0" | "0" |
| 7 | "0" | "1" | "0" |

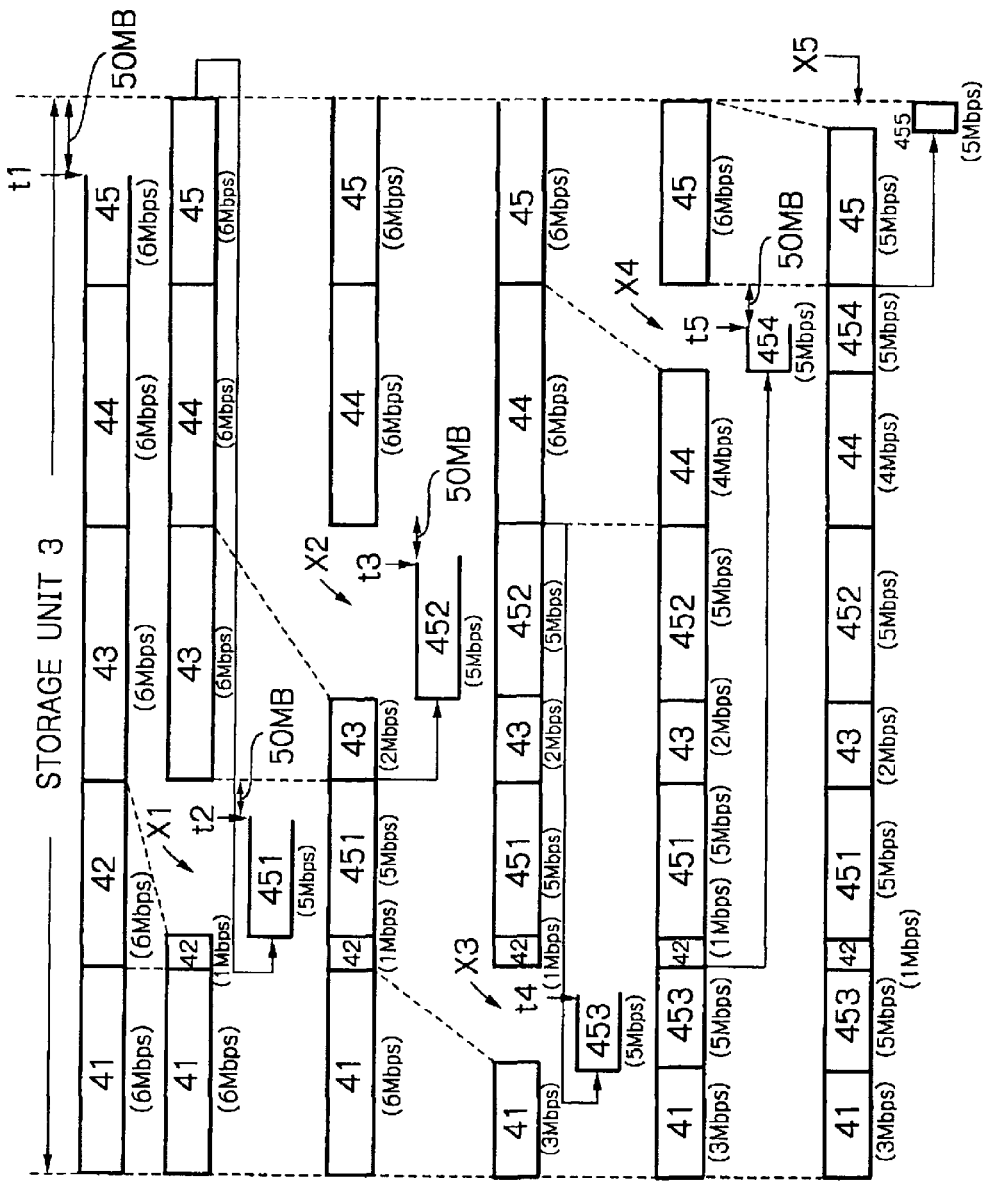

Fig. 25A

| N | 41 | | N | 42 | | N | 43 | | N | 44 | | N | 45 |
|---|---|---|---|---|---|---|---|---|---|---|---|---|---|
| ADD | ... | | ADD | ... | | ADD | ... | | ADD | ... | | ADD | ... |
| NS | ... | | NS | ... | | NS | ... | | NS | ... | | NS | ... |
| R | 6Mbps | | R | 6Mbps | | R | 6Mbps | | R | 6Mbps | | R | 6Mbps |
| FXS | "3" | | FXS | "1" | | FXS | "2" | | FXS | "4" | | FXS | "5" |
| FXH | "0" | | FXH | "0" | | FXH | "0" | | FXH | "0" | | FXH | "0" |
| FXE | "0" | | FXE | "0" | | FXE | "0" | | FXE | "0" | | FXE | "0" |

Fig. 25B

| N | 41 | | N | 42 | | N | 43 | | N | 44 | | N | 45 |
|---|---|---|---|---|---|---|---|---|---|---|---|---|---|
| ADD | ... | | ADD | ... | | ADD | ... | | ADD | ... | | ADD | ... |
| NS | ... | | NS | ... | | NS | ... | | NS | ... | | NS | ... |
| R | 6Mbps | | R | 1Mbps | | R | 6Mbps | | R | 6Mbps | | R | 6Mbps |
| FXS | "3" | | FXS | "1" | | FXS | "2" | | FXS | "4" | | FXS | "5" |
| FXH | "0" | | FXH | "0" | | FXH | "0" | | FXH | "0" | | FXH | "0" |
| FXE | "0" | | FXE | "0" | | FXE | "0" | | FXE | "0" | | FXE | "0" |

| N | 451 |
|---|---|
| ADD | ... |
| NS | ... |
| R | 5Mbps |
| FXS | "5" |
| FXH | "0" |
| FXE | "0" |

Fig. 25C

| N | 41 | | N | 42 | | N | 43 | | N | 44 | | N | 45 |
|---|---|---|---|---|---|---|---|---|---|---|---|---|---|
| ADD | ... | | ADD | ... | | ADD | ... | | ADD | ... | | ADD | ... |
| NS | ... | | NS | ... | | NS | ... | | NS | ... | | NS | ... |
| R | 6Mbps | | R | 1Mbps | | R | 2Mbps | | R | 6Mbps | | R | 6Mbps |
| FXS | "3" | | FXS | "1" | | FXS | "2" | | FXS | "4" | | FXS | "5" |
| FXH | "0" | | FXH | "0" | | FXH | "0" | | FXH | "0" | | FXH | "0" |
| FXE | "0" | | FXE | "0" | | FXE | "0" | | FXE | "0" | | FXE | "0" |

| N | 451 | | N | 452 |
|---|---|---|---|---|
| ADD | ... | | ADD | ... |
| NS | ... | | NS | ... |
| R | 5Mbps | | R | 5Mbps |
| FXS | "5" | | FXS | "5" |
| FXH | "0" | | FXH | "0" |
| FXE | "0" | | FXE | "0" |

Fig. 25D

| N | 41 | | N | 42 | | N | 43 | | N | 44 | | N | 45 |
|---|---|---|---|---|---|---|---|---|---|---|---|---|---|
| ADD | ... | | ADD | ... | | ADD | ... | | ADD | ... | | ADD | ... |
| NS | ... | | NS | ... | | NS | ... | | NS | ... | | NS | ... |
| R | 3Mbps | | R | 1Mbps | | R | 2Mbps | | R | 6Mbps | | R | 6Mbps |
| FXS | "3" | | FXS | "1" | | FXS | "2" | | FXS | "4" | | FXS | "5" |
| FXH | "0" | | FXH | "0" | | FXH | "0" | | FXH | "0" | | FXH | "1" |
| FXE | "0" | | FXE | "0" | | FXE | "0" | | FXE | "0" | | FXE | "0" |

| N | 451 | | N | 452 | | N | 453 |
|---|---|---|---|---|---|---|---|
| ADD | ... | | ADD | ... | | ADD | ... |
| NS | ... | | NS | ... | | NS | ... |
| R | 5Mbps | | R | 5Mbps | | R | 5Mbps |
| FXS | "5" | | FXS | "5" | | FXS | "5" |
| FXH | "0" | | FXH | "0" | | FXH | "0" |
| FXE | "0" | | FXE | "0" | | FXE | "0" |

Fig. 25E

| N | 41 | | N | 42 | | N | 43 | | N | 44 | | N | 45 |
|---|---|---|---|---|---|---|---|---|---|---|---|---|---|
| ADD | ... | | ADD | ... | | ADD | ... | | ADD | ... | | ADD | ... |
| NS | ... | | NS | ... | | NS | ... | | NS | ... | | NS | ... |
| R | 3Mbps | | R | 1Mbps | | R | 2Mbps | | R | 4Mbps | | R | 5Mbps |
| FXS | "3" | | FXS | "1" | | FXS | "2" | | FXS | "4" | | FXS | "5" |
| FXH | "0" | | FXH | "0" | | FXH | "0" | | FXH | "0" | | FXH | "1" |
| FXE | "0" | | FXE | "0" | | FXE | "0" | | FXE | "0" | | FXE | "0" |

| N | 451 | | N | 452 | | N | 453 | | N | 454 |
|---|---|---|---|---|---|---|---|---|---|---|
| ADD | ... | | ADD | ... | | ADD | ... | | ADD | ... |
| NS | ... | | NS | ... | | NS | ... | | NS | ... |
| R | 5Mbps | | R | 5Mbps | | R | 5Mbps | | R | 5Mbps |
| FXS | "5" | | FXS | "5" | | FXS | "5" | | FXS | "5" |
| FXH | "0" | | FXH | "0" | | FXH | "0" | | FXH | "0" |
| FXE | "0" | | FXE | "0" | | FXE | "0" | | FXE | "0" |

Fig. 25F

| N | 41 |
|---|---|
| ADD | ... |
| NS | ... |
| R | 3Mbps |
| FXS | "3" |
| FXH | "0" |
| FXE | "0" |

| N | 42 |
|---|---|
| ADD | ... |
| NS | ... |
| R | 1Mbps |
| FXS | "1" |
| FXH | "0" |
| FXE | "0" |

| N | 43 |
|---|---|
| ADD | ... |
| NS | ... |
| R | 2Mbps |
| FXS | "2" |
| FXH | "0" |
| FXE | "0" |

| N | 44 |
|---|---|
| ADD | ... |
| NS | ... |
| R | 4Mbps |
| FXS | "4" |
| FXH | "0" |
| FXE | "0" |

| N | 45 |
|---|---|
| ADD | ... |
| NS | ... |
| R | 5Mbps |
| FXS | "5" |
| FXH | "1" |
| FXE | "0" |

| N | 451 |
|---|---|
| ADD | ... |
| NS | ... |
| R | 5Mbps |
| FXS | "5" |
| FXH | "0" |
| FXE | "0" |

| N | 452 |
|---|---|
| ADD | ... |
| NS | ... |
| R | 5Mbps |
| FXS | "5" |
| FXH | "0" |
| FXE | "0" |

| N | 453 |
|---|---|
| ADD | ... |
| NS | ... |
| R | 5Mbps |
| FXS | "5" |
| FXH | "0" |
| FXE | "0" |

| N | 454 |
|---|---|
| ADD | ... |
| NS | ... |
| R | 5Mbps |
| FXS | "5" |
| FXH | "0" |
| FXE | "0" |

| N | 455 |
|---|---|
| ADD | ... |
| NS | ... |
| R | 5Mbps |
| FXS | "5" |
| FXH | "0" |
| FXE | "0" |

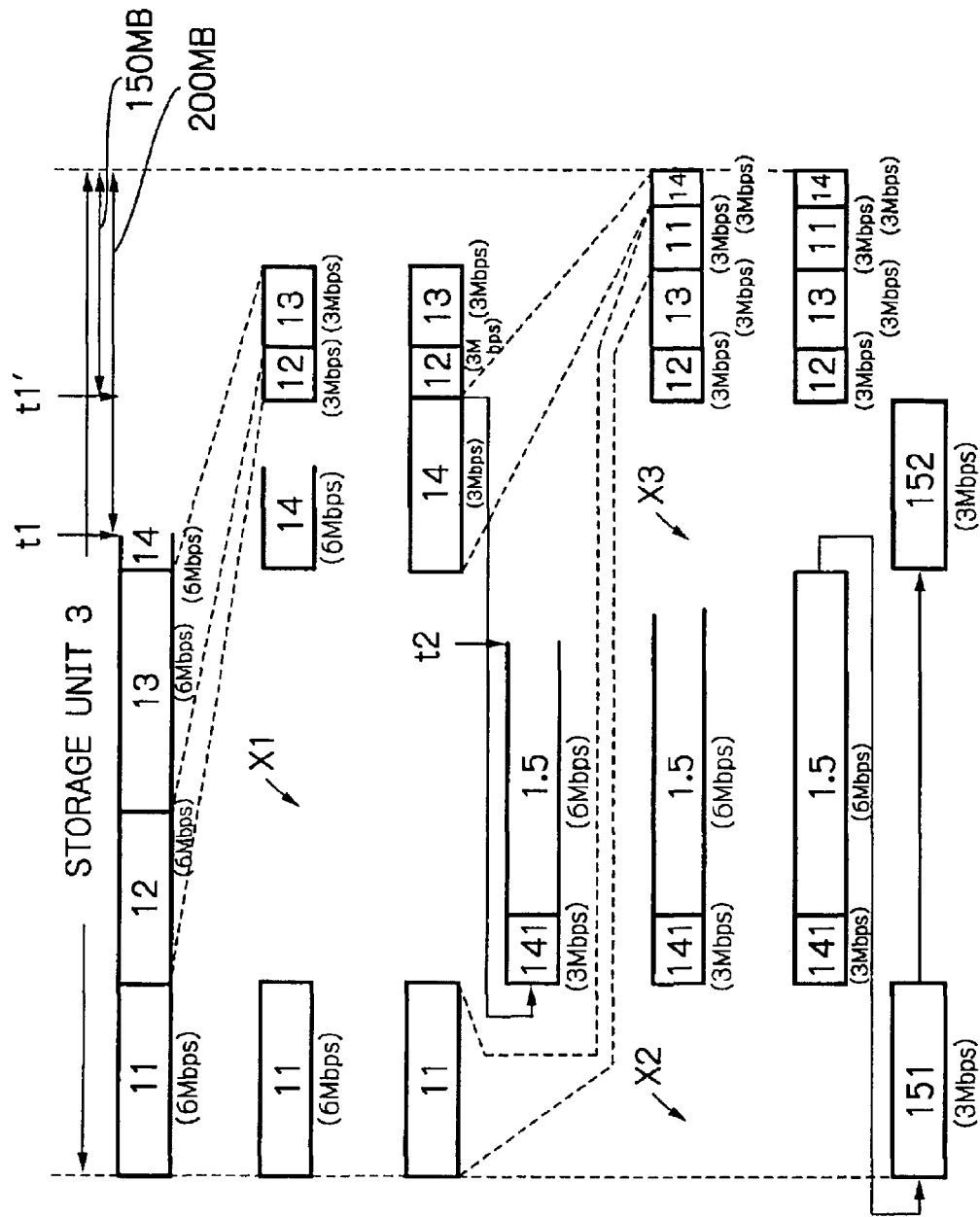

Fig. 27

| N | DATA BLOCK NUMBER |
|---|---|
| ADD | START SECTOR ADDRESS |
| NS | NUMBER OF SECTORS |
| R | COMPRESSION BIT RATE |
| FXM | RECOMPRESSION PERMITTING FLAG |
| FXH | RECOMPRESSION PROHIBITING FLAG |
| FXE | ERASE PERMITTING FLAG |

Fig. 28

| PRIORITY LEVEL | FXM | FXH | FXE |
|---|---|---|---|
| 1 | – | – | "1" |
| 2 | "1" | "0" | "0" |
| 3 | "0" | "0" | "0" |
| 4 | "0" | "1" | "0" |

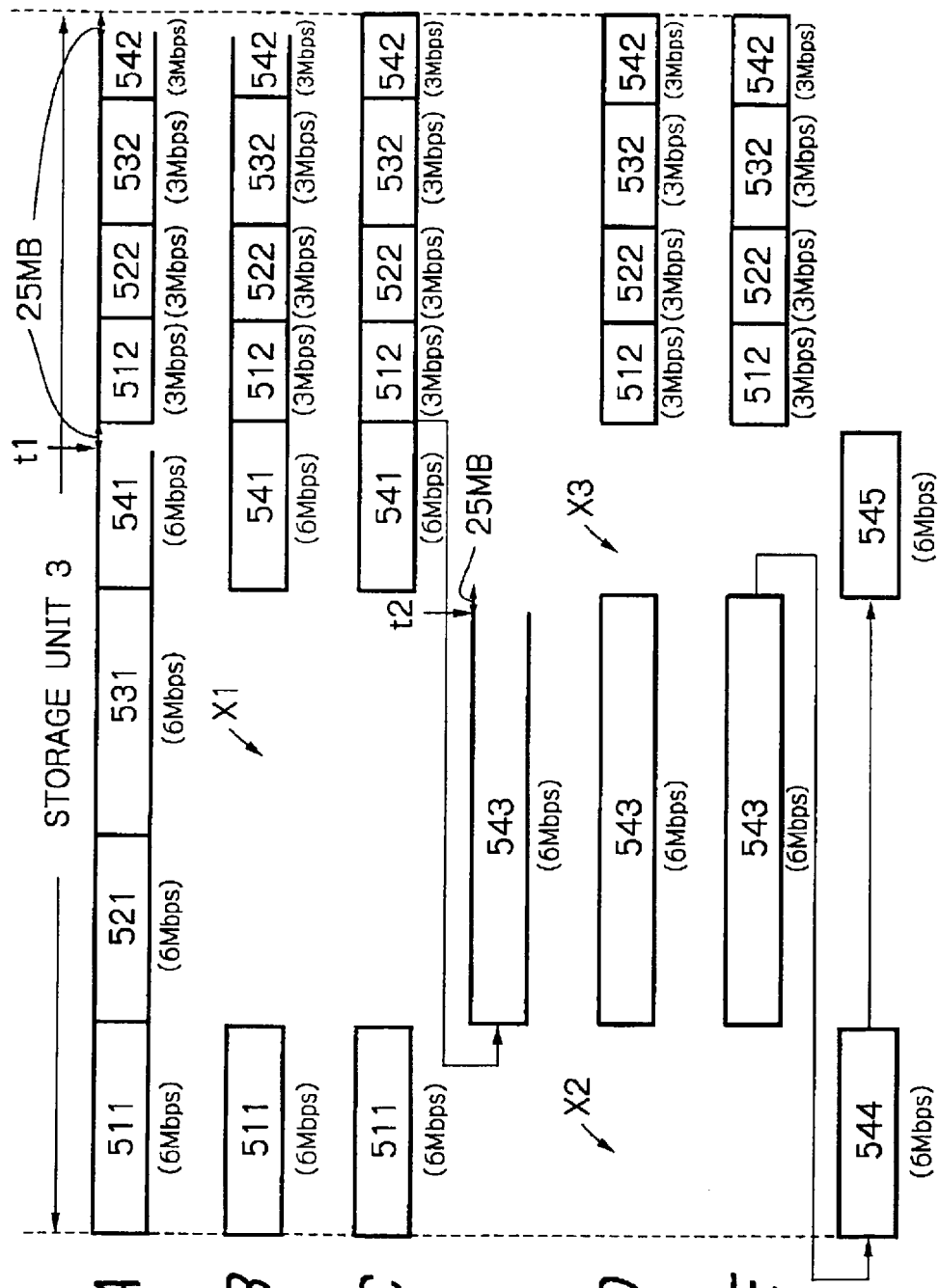

Fig. 32A

| N | 511 |
|---|---|
| ADD | ... |
| NS | ... |
| R | 6Mbps |
| FXM | "0" |
| FXH | "0" |
| FXE | "0" |

| N | 521 |
|---|---|
| ADD | ... |
| NS | ... |
| R | 6Mbps |
| FXM | "1" |
| FXH | "0" |
| FXE | "0" |

| N | 531 |
|---|---|
| ADD | ... |
| NS | ... |
| R | 6Mbps |
| FXM | "1" |
| FXH | "0" |
| FXE | "0" |

| N | 541 |
|---|---|
| ADD | ... |
| NS | ... |
| R | 6Mbps |
| FXM | "0" |
| FXH | "0" |
| FXE | "0" |

| N | 512 |
|---|---|
| ADD | ... |
| NS | ... |
| R | 3Mbps |
| FXM | "0" |
| FXH | "1" |
| FXE | "0" |

| N | 522 |
|---|---|
| ADD | ... |
| NS | ... |
| R | 3Mbps |
| FXM | "0" |
| FXH | "1" |
| FXE | "0" |

| N | 532 |
|---|---|
| ADD | ... |
| NS | ... |
| R | 3Mbps |
| FXM | "0" |
| FXH | "1" |
| FXE | "0" |

| N | 542 |
|---|---|
| ADD | ... |
| NS | ... |
| R | 3Mbps |
| FXM | "0" |
| FXH | "1" |
| FXE | "0" |

Fig. 32B

| N | 511 |
|---|---|
| ADD | ... |
| NS | ... |
| R | 6Mbps |
| FXM | "0" |
| FXH | "0" |
| FXE | "0" |

| N | 541 |
|---|---|
| ADD | ... |
| NS | ... |
| R | 6Mbps |
| FXM | "0" |
| FXH | "0" |
| FXE | "0" |

| N | 512 |
|---|---|
| ADD | ... |
| NS | ... |
| R | 3Mbps |
| FXM | "0" |
| FXH | "1" |
| FXE | "0" |

| N | 522 |
|---|---|
| ADD | ... |
| NS | ... |
| R | 3Mbps |
| FXM | "0" |
| FXH | "1" |
| FXE | "0" |

| N | 532 |
|---|---|
| ADD | ... |
| NS | ... |
| R | 3Mbps |
| FXM | "0" |
| FXH | "1" |
| FXE | "0" |

| N | 542 |
|---|---|
| ADD | ... |
| NS | ... |
| R | 3Mbps |
| FXM | "0" |
| FXH | "1" |
| FXE | "0" |

Fig. 32C

| N | 511 |
|---|---|
| ADD | ... |
| NS | ... |
| R | 6Mbps |
| FXM | "0" |
| FXH | "0" |
| FXE | "0" |

| N | 543 |
|---|---|
| ADD | ... |
| NS | ... |
| R | 6Mbps |
| FXM | "0" |
| FXH | "0" |
| FXE | "0" |

| N | 541 |
|---|---|
| ADD | ... |
| NS | ... |
| R | 6Mbps |
| FXM | "0" |
| FXH | "0" |
| FXE | "0" |

| N | 512 |
|---|---|
| ADD | ... |
| NS | ... |
| R | 3Mbps |
| FXM | "0" |
| FXH | "1" |
| FXE | "0" |

| N | 522 |
|---|---|
| ADD | ... |
| NS | ... |
| R | 3Mbps |
| FXM | "0" |
| FXH | "1" |
| FXE | "0" |

| N | 532 |
|---|---|
| ADD | ... |
| NS | ... |
| R | 3Mbps |
| FXM | "0" |
| FXH | "1" |
| FXE | "0" |

| N | 542 |
|---|---|
| ADD | ... |
| NS | ... |
| R | 3Mbps |
| FXM | "0" |
| FXH | "1" |
| FXE | "0" |

Fig. 32D

| N | 543 |
|---|---|
| ADD | ... |
| NS | ... |
| R | 6Mbps |
| FXM | "0" |
| FXH | "0" |
| FXE | "0" |

| N | 512 |
|---|---|
| ADD | ... |
| NS | ... |
| R | 3Mbps |
| FXM | "0" |
| FXH | "1" |
| FXE | "0" |

| N | 522 |
|---|---|
| ADD | ... |
| NS | ... |
| R | 3Mbps |
| FXM | "0" |
| FXH | "1" |
| FXE | "0" |

| N | 532 |
|---|---|
| ADD | ... |
| NS | ... |
| R | 3Mbps |
| FXM | "0" |
| FXH | "1" |
| FXE | "0" |

| N | 542 |
|---|---|
| ADD | ... |
| NS | ... |
| R | 3Mbps |
| FXM | "0" |
| FXH | "1" |
| FXE | "0" |

Fig. 32E

| N | 544 |
|---|---|
| ADD | ... |
| NS | ... |
| R | 6Mbps |
| FXM | "0" |
| FXH | "0" |
| FXE | "0" |

| N | 543 |
|---|---|
| ADD | ... |
| NS | ... |
| R | 6Mbps |
| FXM | "0" |
| FXH | "0" |
| FXE | "0" |

| N | 545 |
|---|---|
| ADD | ... |
| NS | ... |
| R | 6Mbps |
| FXM | "0" |
| FXH | "0" |
| FXE | "0" |

| N | 512 |
|---|---|
| ADD | ... |
| NS | ... |
| R | 3Mbps |
| FXM | "0" |
| FXH | "1" |
| FXE | "0" |

| N | 522 |
|---|---|
| ADD | ... |
| NS | ... |
| R | 3Mbps |
| FXM | "0" |
| FXH | "1" |
| FXE | "0" |

| N | 532 |
|---|---|
| ADD | ... |
| NS | ... |
| R | 3Mbps |
| FXM | "0" |
| FXH | "1" |
| FXE | "0" |

| N | 542 |
|---|---|
| ADD | ... |
| NS | ... |
| R | 3Mbps |
| FXM | "0" |
| FXH | "1" |
| FXE | "0" |

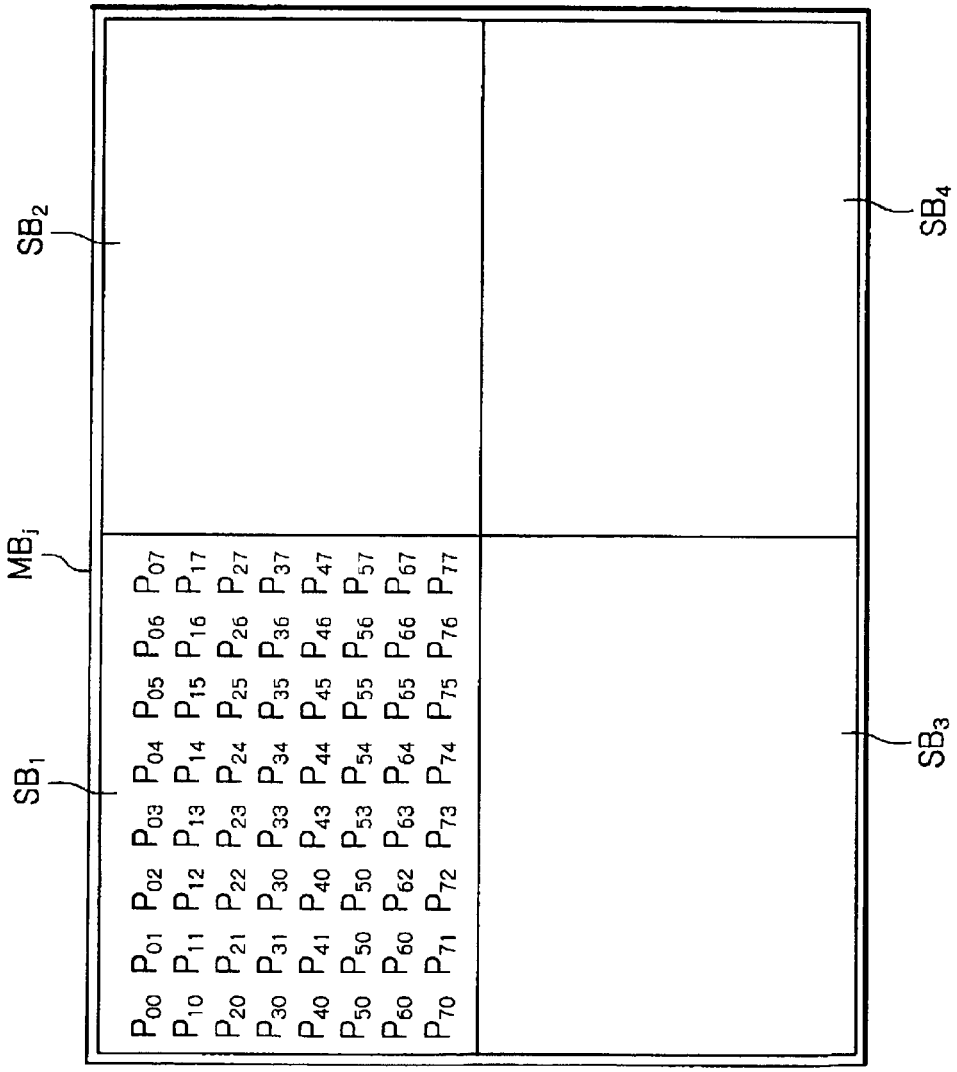

DATA RECORDING AND REPRODUCING METHOD AND APPARATUS CAPABLE OF RECOMPRESSING INDIVIDUAL DATA BLOCKS

BACKGROUND OF THE INVENTION

1. Field of the Invention

The present invention relates to a data recording and reproducing method and apparatus which is preferably used in a personal computer, a home server, a video server formed by a digital versatile disc (DVD) video recorder and a hard disc recorder, and the like, and more particularly, the improvement of a data compression (transcode) in the data recording and reproducing method and apparatus.

2. Description of the Related Art

Generally, in a data recording and reproducing apparatus, a data recompression technology which is called a transcode technology has been adopted. For example, when the capacity of a storage unit is expected to be short while a video/speech signal of a program is being compressed and recorded in the storage unit, a recompressing operation is performed upon data which is already compressed and stored in the storage unit, so as to substantially expand the vacant area of the storage unit. As a result, the above-mentioned program can be completely stored in the storage unit by using the expanded vacant area of the storage unit.

Note that the present invention can be applied not only to a transcode technology, but also to a conventional data compression technology.

In a first prior art data recording and reproducing apparatus (see: JP-A-59-60666, JP-A-2000-066873 and JP-A-2001-231009), when the capacity of a storage unit is expected to be short while transaction data is being recorded in the storage unit, a compressing operation is performed upon data which is already recorded in the storage unit, so as to substantially expand the vacant area of the storage unit. As a result, the above-mentioned transaction data can be completely recorded in the storage unit.

In the above-described first prior art data recording and reproducing apparatus, however, since the compressing operation is performed upon the entire data stored in the storage unit, high priority level data which is expected to be of high quality is also subjected to the compressing operation, so that the quality of the high priority level data deteriorates. Also, if it takes a long time to perform the compressing operation, the vacant area of the storage unit is also short which may incompletely record the transaction data in the storage unit.

In a second prior art data recording and reproducing apparatus (see: JP-A-2000-89983), when the capacity of a storage unit is expected to be short while transaction data is being recorded in the storage unit, a compressing operation is performed upon data having the minimum access frequency and the oldest final access date which is already recorded in the storage unit, so as to substantially expand the vacant area of the storage unit.

In the above-described second prior art data recording and reproducing apparatus, although the transaction data can be completely recorded in the storage unit, high priority level data is also subjected to the compressing operation, so that the quality of the high priority level data deteriorates.

In a third prior art data recording and reproducing apparatus (see: JP-A-2000-322291), compressed data recorded in a storage unit are rearranged to be continuous so that the vacant area of the storage unit is continuous. Then, each of the compressed data is expanded and moved from the non-vacant area of the storage unit to the vacant area of the storage unit.

In the above-described third prior art data recording and reproducing apparatus, although a vacant area is made continuous in the storage unit, there is no disclosure regarding the compression of high priority level data.

In a fourth prior art data recording and reproducing apparatus (see: JP-A-10-271498), when the capacity of a storage unit is expected to be short while picture data is being recorded in the storage unit, a recompressing operation is performed upon compressed picture data which is already recorded in the storage unit, so as to substantially expand the vacant area of the storage unit. In this case, the recompression bit rate depends on the quality of the compressed data, thus maintaining the entire quality level.

In the above-described fourth prior art data recording and reproducing apparatus, however, in order to carry out a recompressing operation simultaneously with retrieving, editing and specially-reproducing operations, a management data showing a relationship among addresses on the storage unit, the number of picture data, and the number of a picture group is provided. As a result, every time a recompressing operation is carried out, the management data has to be renewed and recorded.

SUMMARY OF THE INVENTION

It is an object of the present invention to provide a data recording and reproducing method and apparatus capable of compressing (or recompressing) individual data blocks in accordance with the quality thereof with a minimum change of management data.

According to the present invention, in a data recording and reproducing method, data blocks are recorded in a storage unit. Priority levels each for one of the data blocks are set and stored. It is determined whether or not a vacant area of the storage unit is expected to be short. When the vacant area of the storage unit is expected to be short, the data blocks recorded in the storage unit are recompressed in accordance with the stored priority levels.

BRIEF DESCRIPTION OF THE DRAWINGS

The present invention will be more clearly understood from the description as set below, with reference to the accompanying drawings, wherein:

FIG. 2 is a table stored in the management memory of FIG. 1;

FIG. 3 is a table for explaining the values of the flags of FIG. 2;

FIGS. 6A through 6E are diagrams showing the state of the storage unit of FIG. 1 for explaining the flowchart of FIG. 5;

FIGS. 7A through 7E are diagrams of the tables of the management memory of FIG. 1 for explaining the flowchart of FIG. 5;

FIG. 8 is another table stored in the management memory of FIG. 1;

FIG. 9 is a table for explaining the values of the flags of FIG. 8;

FIG. 10 is a flowchart for explaining a second recording operation of the control unit of FIG. 1;

FIGS. 12A through 12F are diagrams showing the state of the storage unit of FIG. 1 for explaining the flowchart of FIG. 11;

FIGS. 13A through 13F are diagrams of the tables of the management memory of FIG. 1 for explaining the flowchart of FIG. 11;

FIG. 14 is a further table stored in the management memory of FIG. 1;

FIG. 15 is a table for explaining the values of the flags of FIG. 14;

FIGS. 18A through 18C are diagrams showing the state of the storage unit of FIG. 1 for explaining the flowchart of FIG. 17;

FIGS. 19A through 19C are diagrams of the tables of the management memory of FIG. 1 for explaining the flowchart of FIG. 17;

FIG. 20 is a further table stored in the management memory of FIG. 1;

FIG. 21 is a table for explaining the values of the flags of FIG. 20;

FIGS. 24A through 24F are diagrams showing the state of the storage unit of FIG. 1 for explaining the flowchart of FIG. 23;

FIGS. 25A through 25F are diagrams of the tables of the management memory of FIG. 1 for explaining the flowchart of FIG. 23;

FIGS. 26A through 26E are diagrams illustrating modifications of FIGS. 6A through 6E;

FIG. 27 is a further table stored in the management memory of FIG. 1;

FIG. 28 is a table for explaining the values of the flags of FIG. 27;

FIGS. 31A through 31E are diagrams showing the state of the storage unit of FIG. 1 for explaining the flowchart of FIG. 30;

FIGS. 32A through 32E are diagrams of the tables of the management memory of FIG. 1 for explaining the flowchart of FIG. 30; and FIG. 33 is a diagram for explaining the information amount of one data block.

DESCRIPTION OF THE PREFERRED EMBODIMENT

Figure 1:
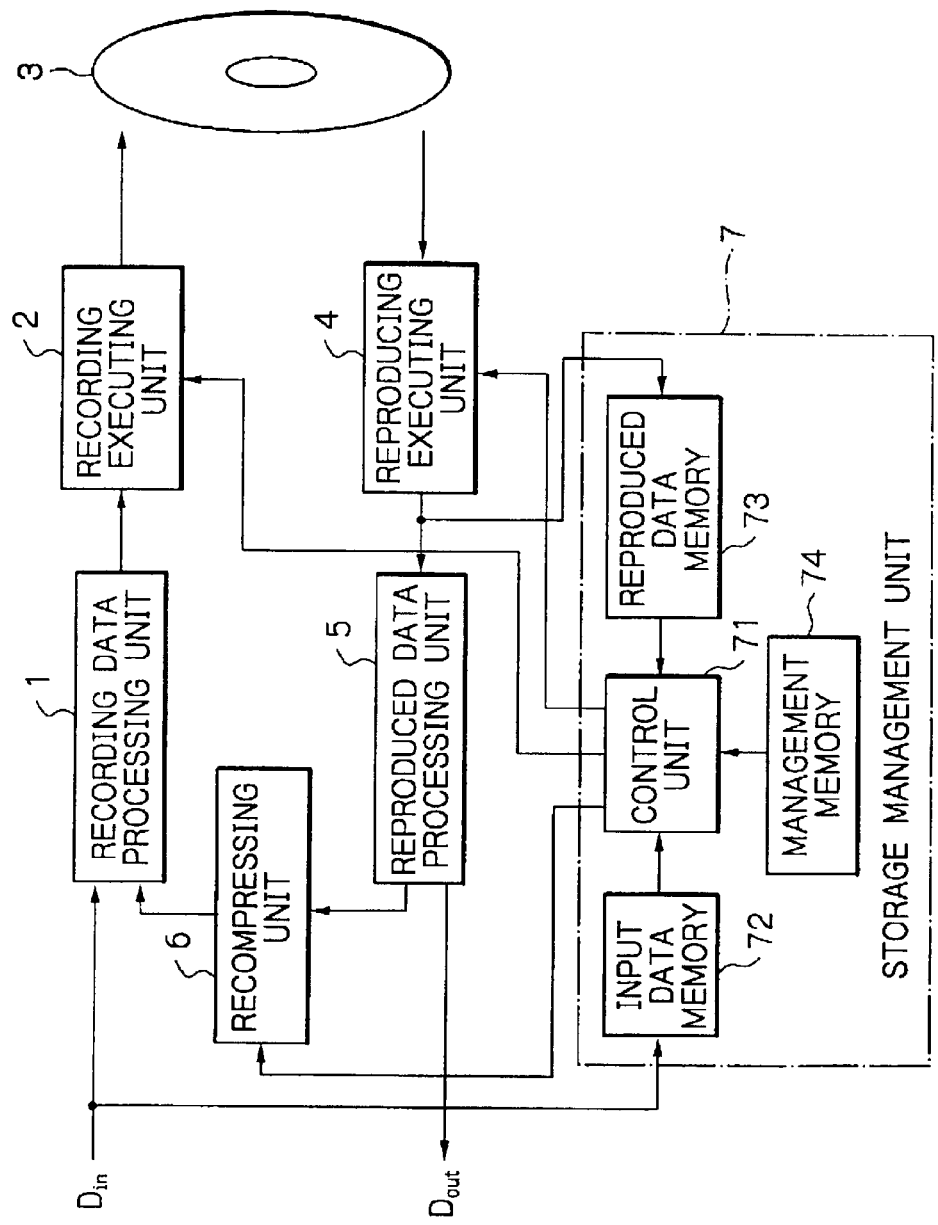
FIG. 1 is a block circuit diagram illustrating an embodiment of the data recording and reproducing apparatus according to the present invention.

In FIG. 1, which illustrates an embodiment of the data recording and reproducing apparatus according to the present invention, an input data signal $D_{in}$ such as a video signal and a speech signal is subjected by a recording data processing unit 1 to a data recording process including a compressing process, and is then recorded by a recording executing unit 2 in a storage unit 3 such as a magnetic disc unit or an optical disc unit. Thus, the input signal $D_{in}$ is compressed and written into the storage unit 3.

On the other hand, data recorded in the storage unit 3 is reproduced by a reproducing executing unit 4 and is then subjected by a reproduced data processing unit 5 to a reproduced data process including an expanding process. Thus, the data recorded in the storage unit 3 is expanded and output as an output data signal $D_{out}$.

Also, connected between the reproduced data processing unit 5 and the recording data processing unit 1 is a recompressing unit 6 for performing a recompressing operation upon the expanded data by the reproduced data processing unit 5.

The recording executing unit 2, the reproducing executing unit 4 and the recompressing unit 6 are controlled by a storage management unit 7 which includes a control unit 71, an input data memory 72 for storing the input data signal $D_{in}$, a reproduced data memory 73 for storing reproduced data from the reproducing executing unit 4 and a management memory 74 for storing management data. The control unit 71 is constructed by a central processing unit (CPU), a read-only memory (ROM) for storing programs, a random access memory (RAM) for storing temporary data and the like.

A first operation of the control unit 71 will be explained with reference to FIGS. 2, 3, 4, 5, 6A through 6E and 7A through 7E.

In FIG. 2, which shows a table stored in the management memory 74 for storing management data for one data block, N designates a data block number allocated to the data block, ADD designates a start sector address of the data block N recorded in the storage unit 3, NS designates a number of sectors of the data block N recorded in the storage unit 3, R designates a compression bit rate such as 6 Mbps, 3 Mbps, 2 Mbps and 1 Mbps of the data block N recorded in the storage unit 3, FXM designates a recompression permitting flag calculated for the data block N, FXH designates a recompression prohibiting flag calculated for the data block N, and FXE designates an erase permitting flag calculated for the data block N.

The recompression permitting flag FXM, the recompression prohibiting flag FXH and the erase permitting flag FXE of FIG. 2 are calculated in accordance with the priority level of the data block as shown in FIG. 3. This will be explained in detail later.

A first recording operation of the control unit 71 of FIG. 1 will be explained next with reference to FIG. 4. The routine of FIG. 4 is carried out every time when one data block is stored in the input data memory 72.

First, at step 401, the control unit 71 calculates management data for the data block which is supplied to the recording data processing unit 1 and the input data memory 72. That is, a data block number N, a start sector address ADD, a number NS, a compression bit rate R, a recompression, permitting flag FXM, a recompression prohibiting flag FXH and an erase permitting flag FXE are calculated in accordance with the amount of the data block, the electronic program guide (EPG) information of the data block, the type of the data block and the like.

Next, at step 402, the control unit 71 operates the recording executing unit 2 in accordance with the management data calculated at step 401, thus recording the data block in the storage unit 3.

Figure 4:
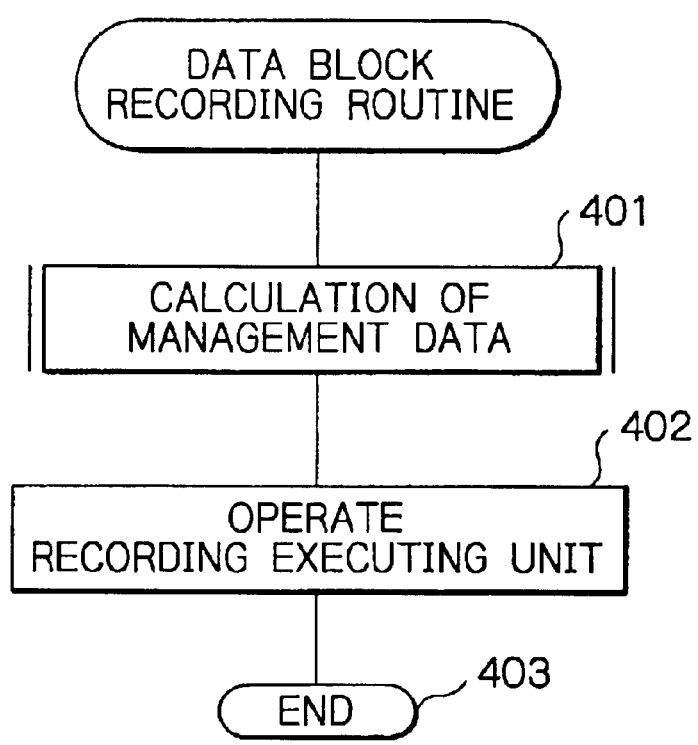
FIG. 4 is a flowchart for explaining a first recording operation of the control unit of FIG. 1.

Then, the routine of FIG. 4 is completed by step 403.

Figure 5:
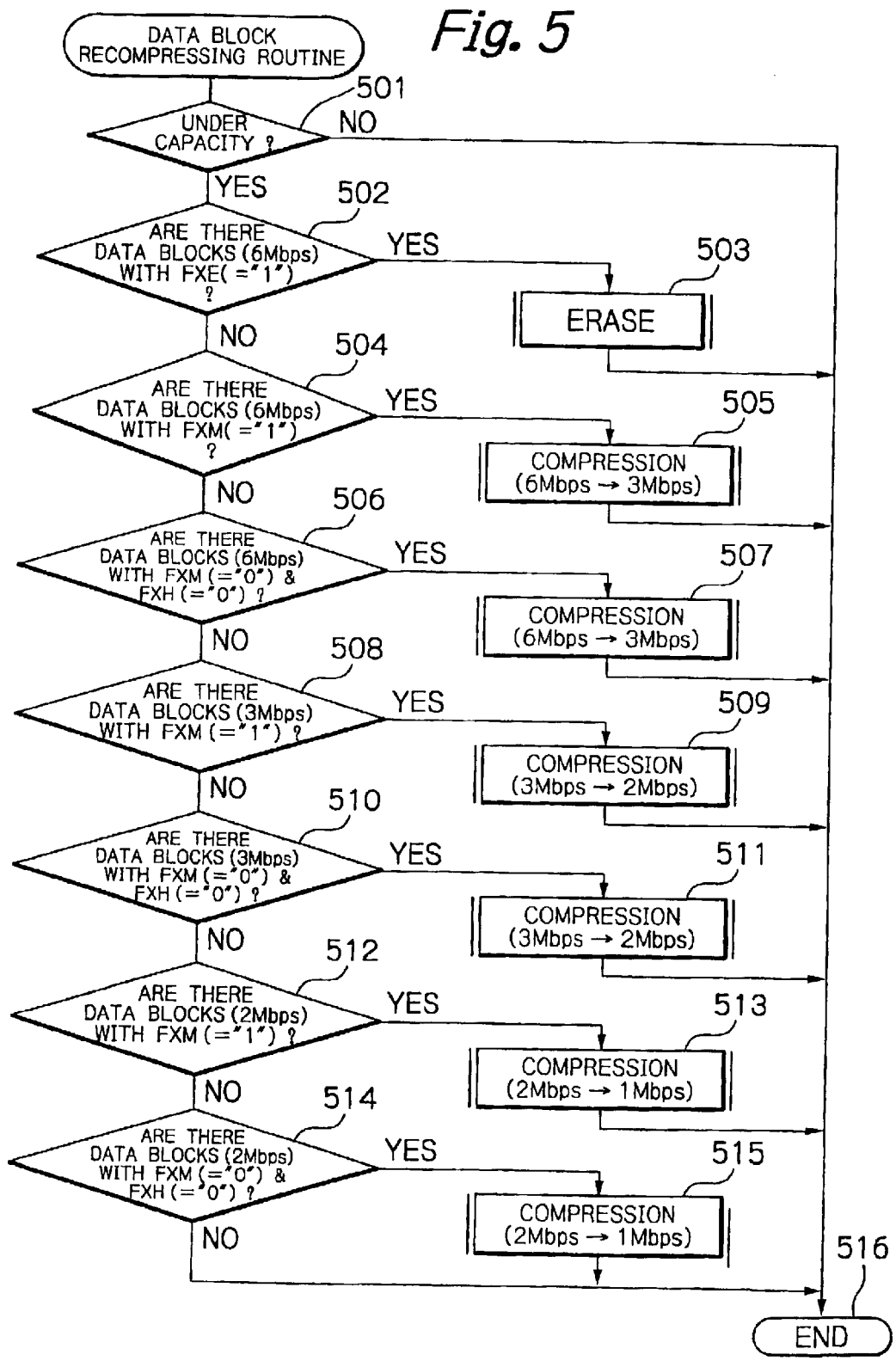
FIG. 5 is a flowchart for explaining a first recompressing operation of the control unit of FIG. 1.

A first recompressing operation of the control unit 71 of FIG. 1 will be explained next with reference to FIGS. 5, 6A through 6E and 7A through 7E. The routine of FIG. 5 is carried out simultaneously when the routine of FIG. 4 is being carried out. Initially, assume that data blocks 11, 12, 13 and 14 which also denote the numbers thereof are already recorded with a compression bit rate R of 6 Mbps in the storage unit 3 and a data block 15 is being recorded with a compression bit rate R of 6 Mbps in the storage unit 3 as shown in FIG. 6A, and the data blocks 11, 12, 13, 14 and 15 have management data as shown in FIG. 7A. That is, the recompression permitting flag FXM(="1") is allocated to only the data blocks 12 and 13.

First, at step 501, it is determined whether or not the capacity of a vacant area of the storage unit 3 is smaller than a predetermined value such as 50 MB. Only when the capacity of the vacant area of the storage unit 3 is smaller than the predetermined value, does the control proceed to step 502. Otherwise, the control proceeds directly to step 516. For example, at a location t1 of FIG. 6A, the control proceeds to step 502.

At step 502, it is determined whether or not there are data blocks (R=6 Mbps) with an erase permission flag FXE(="1"). Only when there are such data blocks, does the control proceed to step 503 which erases such data blocks, i.e., erases the management data thereof in the management memory 74. Then, the control proceeds to step 516. Otherwise, the control proceeds to step 504. Note that there are no such data blocks in FIG. 6A.

At step 504, it is determined whether or not there are data blocks (R=6 Mbps) with a recompression permitting flag FXM(="1"). Only when there are such data blocks, does the control proceed to step 505 which performs a recompressing operation upon such data blocks so that the compression bit rate R thereof is changed from 6 Mbps to 3 Mbps. Then, the control proceeds to step 516. Otherwise, the control proceeds to step 506. Note that the blocks 12 and 13 (R=6 Mbps) of FIGS. 6A have the recompression permitting flag FXM(="1"). As a result, as shown in FIGS. 6B and 7B, the data blocks 12 and 13 are recompressed so that the compression bit rate R is changed from 6 Mbps to 3 Mbps and the sector numbers NS are decreased to expand the vacant area of the storage unit 3 as indicated by X1 and X2. Therefore, when the recording operation for the data block 15 continues, data of the data block 15 is also recorded with a recompression bit rate R of 3 Mbps in the vacant areas X1 and X2 as shown in FIG. 6C. In this case, "151" and "152" are allocated as data block numbers N to the data block 15 recorded in the vacant areas X1 and X2 as shown in FIG. 7C.

At step 506, it is determined whether or not there are data blocks (R=6 Mbps) with a recompression permitting flag FXM(="0") and a recompression prohibiting flag FXH(="0"). Only when there are such data blocks, does the control proceed to step 507 which performs a recompressing operation upon such data blocks so that the compression bit rate R thereof is changed from 6 Mbps to 3 Mbps. Then, the control proceeds to step 516. Otherwise, the control proceeds to step 506. Note that the blocks 11, 14 and 15 (R=6 Mbps) of FIG. 6C have the recompression flag FXM(="0") and the recompression prohibition flag FXH(="0"). As a result, at a location of t2 of FIG. 6C, as shown in FIGS. 6D and 7D, the data blocks 11, 14 and 15 are recompressed so that the compression bit rate R is changed from 6 Mbps to 3 Mbps and the sector numbers NS are decreased to expand the vacant area of the storage unit 3 as indicated by X3, X4 and X5. Therefore, when the recording operation for the data block 152 continues, data of the data block 152 is also recorded with a recompression bit rate R of 3 Mbps in the vacant areas X3, X4 and X5 as shown in FIG. 6E. In this case, "153", "154" and "155" are allocated as data block numbers N to the data block 15 recorded in the vacant areas X3, X4 and X5 as shown in FIG. 7E.

Thus, all the data blocks 11, 12, 13, 14, 15, 151, 152, 153, 154 and 155 are recorded with the compression bit rate R of 3 Mbps in the storage unit 3.

In the above-mentioned state, if another data block is expected to be recorded in the storage unit 3 so that the capacity of a vacant area of the storage unit 3 is smaller than the predetermined value, the control proceeds to steps 508, 509, 510 and 511, so that the data blocks recorded in the storage unit 3 are recompressed so that the compression bit rate R is changed from 3 Mbps to 2 Mbps and the sector number NS are decreased to expand the vacant area of the storage unit 3. Thus, the other data block is recorded in the storage unit 3 by using this expanded vacant area of the storage unit 3.

In the above-mentioned state, if a further data block is expected to be recorded in the storage unit 3 so that the capacity of a vacant area of the storage unit 3 is smaller than the predetermined value, the control proceeds to steps 512, 513, 514 and 515, so that the data blocks recorded in the storage unit 3 are recompressed so that the compression bit rate R is changed from 2 Mbps to 1 Mbps and the sector number NS are decreased to expand the vacant area of the storage unit 3. Thus, the further data block is also recorded in the storage unit 3 by using this expanded vacant area of the storage unit 3.

In the first operation as illustrated in FIGS. 2, 3, 4, 5, 6A through 6E and 7A through 7E, although the compression bit rates are 6 Mbps, 3 Mbps, 2 Mbps and 1 Mbps, the compression bit rates can be other values.

A second operation of the control unit 71 will be explained next with reference to FIGS. 8, 9, 10, 11, 12A through 12F and 13A through 13F.

In FIG. 8, which shows a table stored in the management memory 74 for storing management data for one data block, a recompression sequence flag FXS is provided instead of the recompression permitting flag FXM of FIG. 2. For example, if FXD="1", the sequence of recompression is the first order, if FXS="2", the sequence of recompression is the second order, if FXS="3", the sequence of recompression is the third order, if FXS="4", the sequence of recompression is the fourth order, and if FXS="5", the sequence of recompression is the fifth order.

The recompression sequence flag FXS, the recompression prohibiting flag FXH and the erase permitting flag FXE of FIG. 8 are calculated in accordance with the priority level of the data block as shown in FIG. 9. This will be explained in detail later.

A second recording operation of the control unit 71 of FIG. 1 will be explained next with reference to FIG. 10. The routine of FIG. 10 is carried out every time one data block is stored in the input data memory 72.

First, at step 1001, the control unit 71 calculates management data for the data block which is supplied to the recording data processing unit 1 and the input data memory 72. That is, a data block number N, a start sector address ADD, a number NS, a compression bit rate R, a recompression sequence flag FXS, a recompression prohibiting flag FXH and an erase permitting flag FXE are calculated in accordance with the amount of the data block, the electronic program guide (EPG) information of the data block, the type of the data block and the like.

Next, at step 1002, the control unit 71 operates the recording executing unit 2 in accordance with the management data calculated at step 1001, thus recording the data block in the storage unit 3.

Then, the routine of FIG. 10 is completed by step 1003.

Figure 11A:
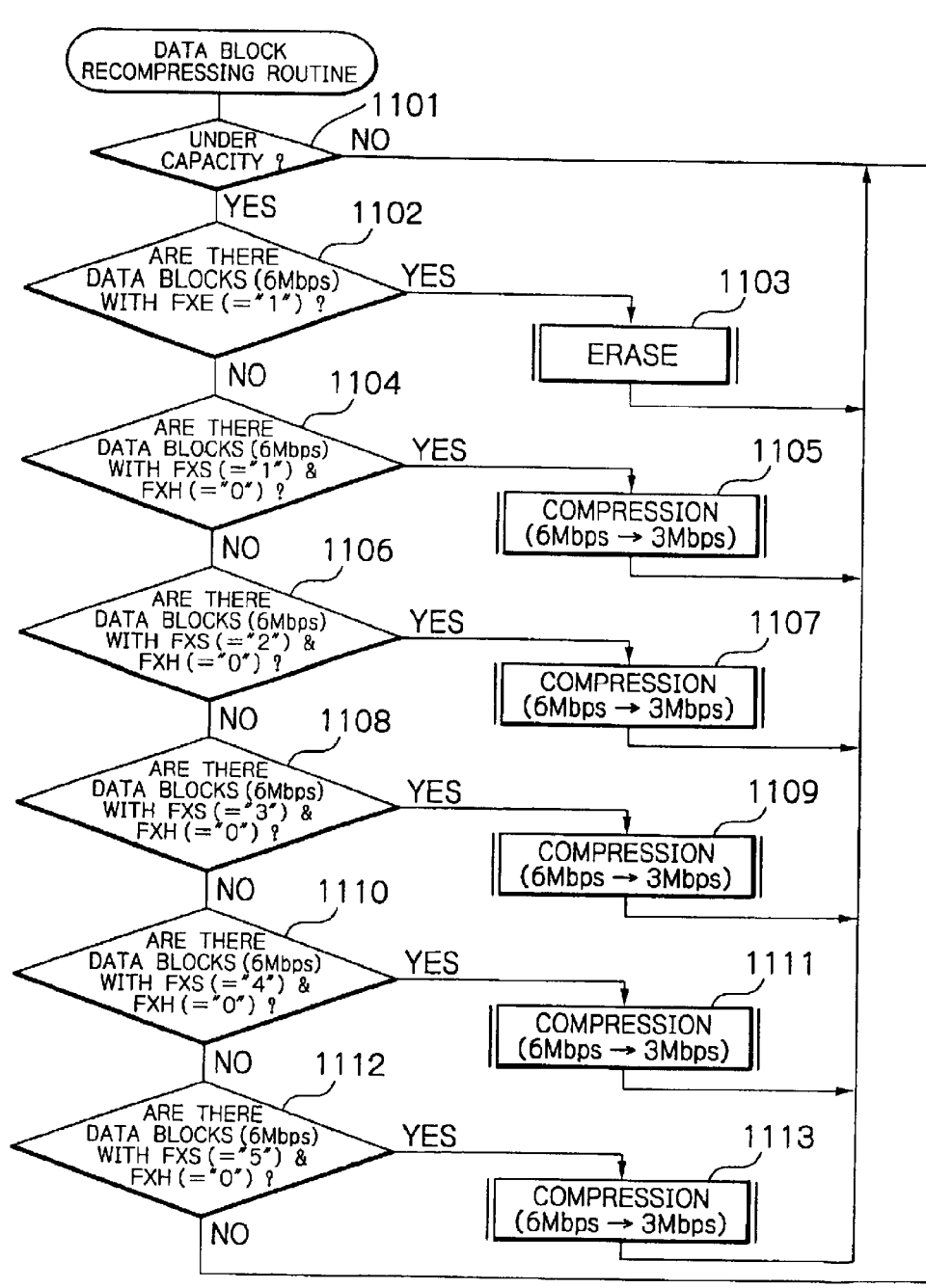
FIG. 11 is a flowchart for explaining a second recompressing operation of the control unit of FIG. 1.
Figure 11C:
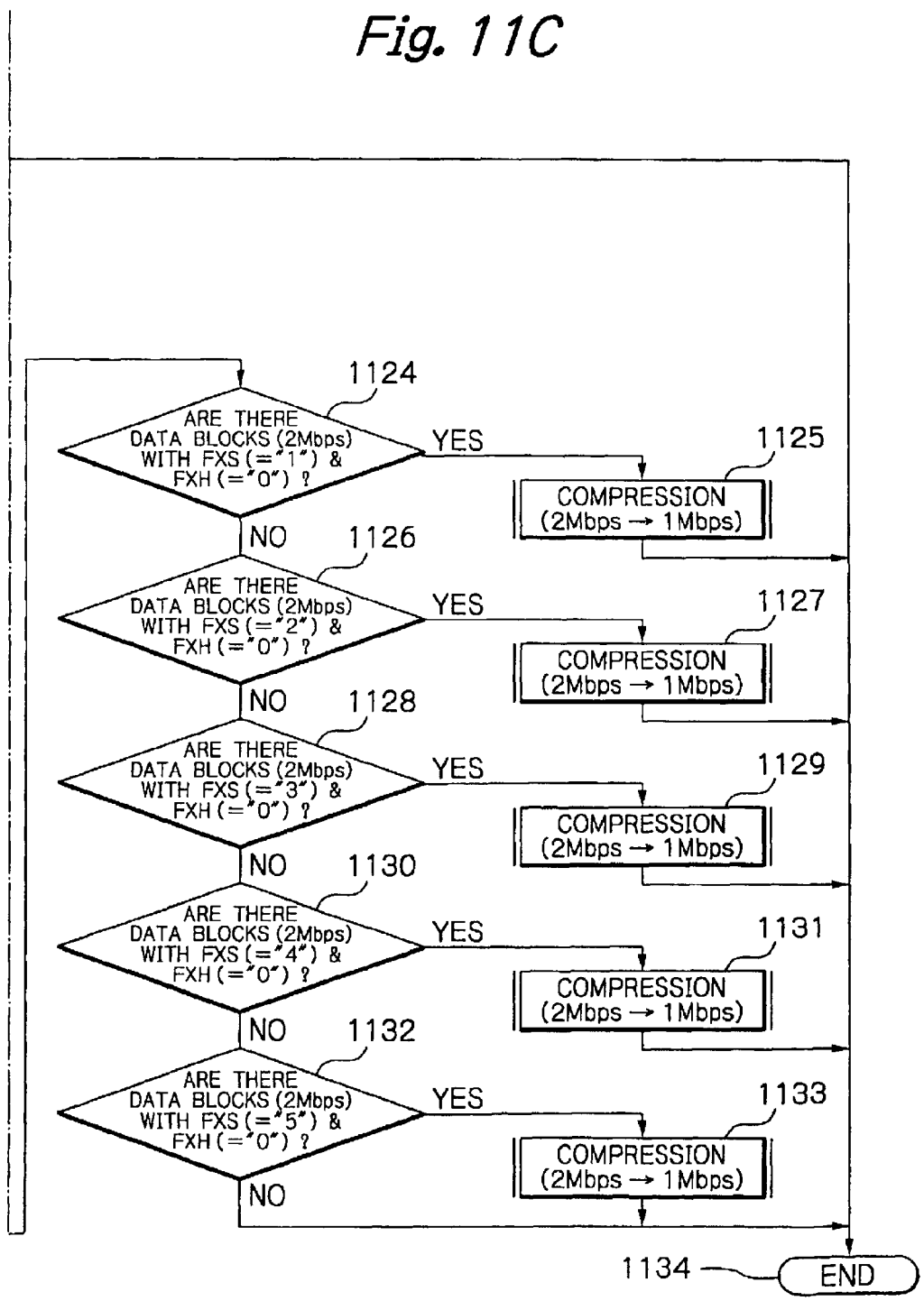

A second recompressing operation of the control unit 71 of FIG. 1 will be explained next with reference to FIGS. 11, 12A through 12F and 13A through 13F. The routine of FIG. 11 is carried out simultaneously when the routine of FIG. 10 is being carried out. Initially, assume that data blocks 21, 22, 23 and 24 which also denote the numbers thereof are already recorded with a compression bit rate R of 6 Mbps in the storage unit 3 and a data block 25 is being recorded with a compression bit rate R of 6 Mbps in the storage unit 3 as shown in FIG. 12A, and the data blocks 21, 22, 23, 24 and 25 have management data as shown in FIG. 13A. That is, the recompression sequence flags FXS of the data blocks 21, 22, 23, 24 and 25 are "3", "1", "2", "4" and "5".

First, at step 1101, it is determined whether or not the capacity of a vacant area of the storage unit 3 is smaller than a predetermined value such as 50 MB. Only when the capacity of the vacant area of the storage unit 3 is smaller than the predetermined value, does the control proceed to step 1102. Otherwise, the control proceeds directly to step 1134. For example, at a location t1 of FIG. 12A, the control proceeds to step 1102.

At step 1102, it is determined whether or not there are data blocks (R=6 Mbps) with an erase permission flag FXE(="1"). Only when there are such data blocks, does the control proceed to step 1103 which erases such data blocks, i.e., erases the management data thereof in the management memory 74. Then, the control proceeds to step 1134. Otherwise, the control proceeds to step 1104. Note that there are no such data blocks in FIG. 12A.

At step 1104, it is determined whether or not there are data blocks (R=6 Mbps) with a recompression sequence flag FXS(="1") and a recompression prohibiting flag FXH(="0"). Only when there are such data blocks, does the control proceed to step 1105 which performs a recompressing operation upon such data blocks so that the compression bit rate R thereof is changed from 6 Mbps to 3 Mbps. Then, the control proceeds to step 1134. Otherwise, the control proceeds to step 1106. Note that the block 22 (R=6 Mbps) of FIG. 12A has the recompression flag FXS(="1") with FXH="0". As a result, at a location of t1, as shown in FIGS. 12B and 13B, the data block 22 is recompressed so that the compression bit rate R is changed from 6 Mbps to 3 Mbps and the sector numbers NS are decreased to expand the vacant area of the storage unit 3 as indicated by X1 in FIG. 12B. Therefore, when the recording operation for the data block 25 continues, data of the data block 25 is also recorded with a recompression bit rate R of 3 Mbps in the vacant area X1 as shown in FIG. 12B. In this case, "251" is allocated as data block number N to the data block 25 recorded in the vacant area X1 as shown in FIG. 13B.

At step 1106, it is determined whether or not there are data blocks (R=6 Mbps) with a recompression sequence flag FXS(="2") and a recompression prohibiting flag FXH(="0"). Only when there are such data blocks, does the control proceed to step 1107 which performs a recompressing operation upon such data blocks so that the compression bit rate R thereof is changed from 6 Mbps to 3 Mbps. Then, the control proceeds to step 1134. Otherwise, the control proceeds to step 1108. Note that the block 23 (R=6 Mbps) of FIG. 12B has the recompression flag FXS(="2") with FXH="0". As a result, at a location of t2, as shown in FIGS. 12C and 13C, the data block 23 is recompressed so that the compression bit rate R is changed from 6 Mbps to 3 Mbps and the sector numbers NS are decreased to expand the vacant area of the storage unit 3 as indicated by X2. Therefore, when the recording operation for the data block 25 continues, data of the data block 25 is also recorded with a recompression bit rate R of 3 Mbps in the vacant area X2 as shown in FIG. 12C. In this case, "252" is allocated as data block number N to the data block 25 recorded in the vacant area X2 as shown in FIG. 13C.

At step 1108, it is determined whether or not there are data blocks (R=6 Mbps) with a recompression sequence flag FXS(="3") and a recompression prohibiting flag FXH(="0"). Only when there are such data blocks, does the control proceed to step 1109 which performs a recompressing operation upon such data blocks so that the compression bit rate R thereof is changed from 6 Mbps to 3 Mbps. Then, the control proceeds to step 1134. Otherwise, the control proceeds to step 1110. Note that the block 21 (R=6 Mbps) of FIG. 12C has the recompression flag FXS(="3") with FXH="0". As a result, at a location of t3, as shown in FIGS. 12D and 13D, the data block 21 is recompressed so that the compression bit rate R is changed from 6 Mbps to 3 Mbps and the sector numbers NS are decreased to expand the vacant area of the storage unit 3 as indicated by X3. Therefore, when the recording operation for the data block 25 continues, data of the data block 25 is also recorded with a recompression bit rate R of 3 Mbps in the vacant area X3 as shown in FIG. 12D. In this case, "253" is allocated as data block number N to the data block 25 recorded in the vacant area X3 as shown in FIG. 13D.

At step 1110, it is determined whether or not there are data blocks (R=6 Mbps) with a recompression sequence flag FXS(="4") and a recompression prohibiting flag FXH(="0"). Only when there are such data blocks, does the control proceed to step 1111 which performs a recompressing operation upon such data blocks so that the compression bit rate R thereof is changed from 6 Mbps to 3 Mbps. Then, the control proceeds to step 1134. Otherwise, the control proceeds to step 1112. Note that the block 24 (R=6 Mbps) of FIG. 12D has the recompression flag FXS(="4") with FXH="0". As a result, at a location of t4, as shown in FIGS. 12E and 13E, the data block 24 is recompressed so that the compression bit rate R is changed from 6 Mbps to 3 Mbps and the sector numbers NS are decreased to expand the vacant area of the storage unit 3 as indicated by X4. Therefore, when the recording operation for the data block 25 continues, data of the data block 25 is also recorded with a recompression bit rate R of 3 Mbps in the vacant area X4 as shown in FIG. 12E. In this case, "254" is allocated as data block number N to the data block 25 recorded in the vacant area X4 as shown in FIG. 13E.

At step 1112, it is determined whether or not there are data blocks (R=6 Mbps) with a recompression sequence flag FXS(="5") and a recompression prohibiting flag FXH(="0"). Only when there are such data blocks, does the control proceed to step 1113 which performs a recompressing operation upon such data blocks so that the compression bit rate R thereof is changed from 6 Mbps to 3 Mbps. Then, the control proceeds to step 1134. Otherwise, the control proceeds to step 1114. Note that the block 25 (R=6 Mbps) of FIG. 12E has the recompression flag FXS(="5") with FXH="0". As a result, at a location of t5, as shown in FIGS. 12F and 13F, the data block 25 is recompressed so that the compression bit rate R is changed from 6 Mbps to 3 Mbps and the sector numbers NS are decreased to expand the vacant area of the storage unit 3 as indicated by X5. Therefore, when the recording operation for the data block 25 continues, data of the data block 25 is also recorded with a recompression bit rate R of 3 Mbps in the vacant area X5 as shown in FIG. 12F. In this case, "255" is allocated as data block number N to the data block 25 recorded, in the vacant area X5 as shown in FIG. 13F.

Thus, all the data blocks 21, 22, 23, 24, 25, 251, 252, 253, 254 and 255 are recorded with the compression bit rate R of 3 Mbps in the storage unit 3.

In the above-mentioned state, if another data block is expected to be recorded in the storage unit 3 so that the capacity of a vacant area of the storage unit 3 is smaller than the predetermined value, the control proceeds to steps 1114 through 1123, so that the data blocks recorded in the storage unit 3 are recompressed so that the compression bit rate R is changed from 3 Mbps to 2 Mbps and the sector number NS are decreased to expand the vacant area of the storage unit 3. Thus, the other data block is recorded in the storage unit 3 by using this expanded vacant area of the storage unit 3.

In the above-mentioned state, if a further data block is expected to be recorded in the storage unit 3 so that the capacity of a vacant area of the storage unit 3 is smaller than the predetermined value, the control proceeds to steps 1124 through 1133, so that the data blocks recorded in the storage unit 3 are recompressed so that the compression bit rate R is changed from 2 Mbps to 1 Mbps and the sector number NS are decreased to expand the vacant area of the storage unit 3. Thus, the further data block is also recorded in the storage unit 3 by using this expanded vacant area of the storage unit 3.

In the second operation as illustrated in FIGS. 8, 9, 10, 11, 12A through 12F and 13A through 13F, although the compression bit rates are 6 Mbps, 3 Mbps, 2 Mbps and 1 Mbps, the compression bit rates can be other values.

A third operation of the control unit 71 will be explained next with reference to FIGS. 14, 15, 16, 17, 18A through 18C and 19A through 19C.

In FIG. 14, which shows a table stored in the management memory 74 for storing management data for one data block, a recompression sequence flag FXS is provided instead of the recompression permitting flag FXM of FIG. 2. For example, if FXS="1", the sequence of recompression is the first order, if FXS="2", the sequence of recompression is the second order, if FXS="3", the sequence of recompression is the third order, and if FXS="4", the,sequence of recompression is the fourth order.

The recompression sequence flag FXS, the recompression prohibiting flag FXH and the erase permitting flag FXE of FIG. 14 are calculated in accordance with the priority level of the data block as shown in FIG. 15. This will be explained in detail later.

A third recording operation of the control unit 71 of FIG. 1 will be explained next with reference to FIG. 16. The routine of FIG. 16 is carried out every time when one data block is stored in the input data memory 72.

First, at step 1601, the control unit 71 calculates management data for the data block which is supplied to the recording data processing unit 1 and the input data memory 72. That is, a data block number N, a start sector address ADD, a number NS, a compression bit rate R, a recompression sequence flag FXS, a recompression prohibiting flag FXH and an erase permitting flag FXE are calculated in accordance with the amount of the data block, the electronic program guide (EPG) information of the data block, the type of the data block and the like.

Next, at step 1602, the control unit 71 operates the recording executing unit 2 in accordance with the management data calculated at step 1601, thus recording the data block in the storage unit 3.

Figure 16:
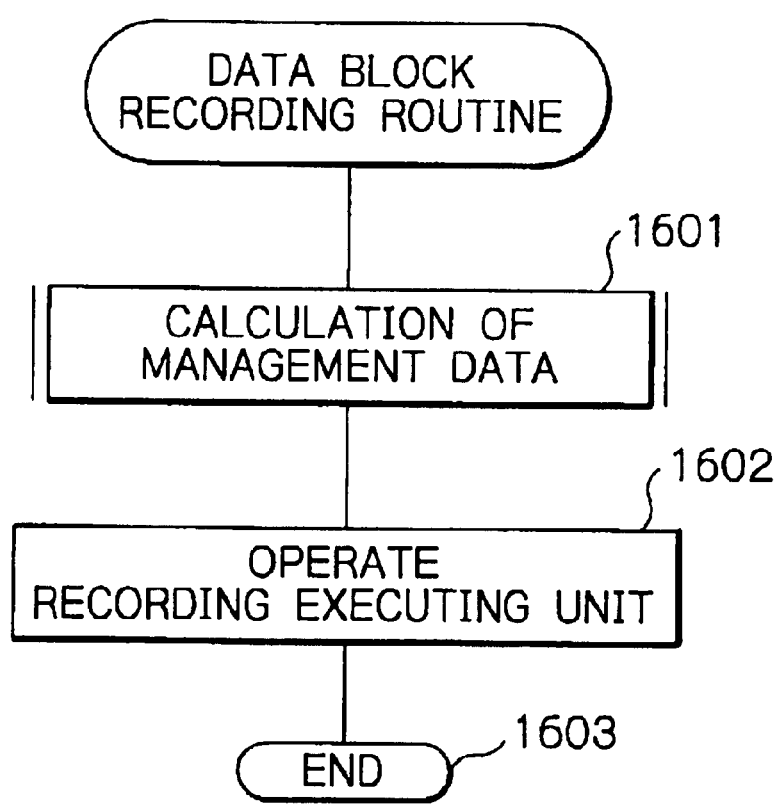
FIG. 16 is a flowchart for explaining a third recording operation of the control unit of FIG. 1.

Then, the routine of FIG. 16 is completed by step 1603.

Figure 17A:
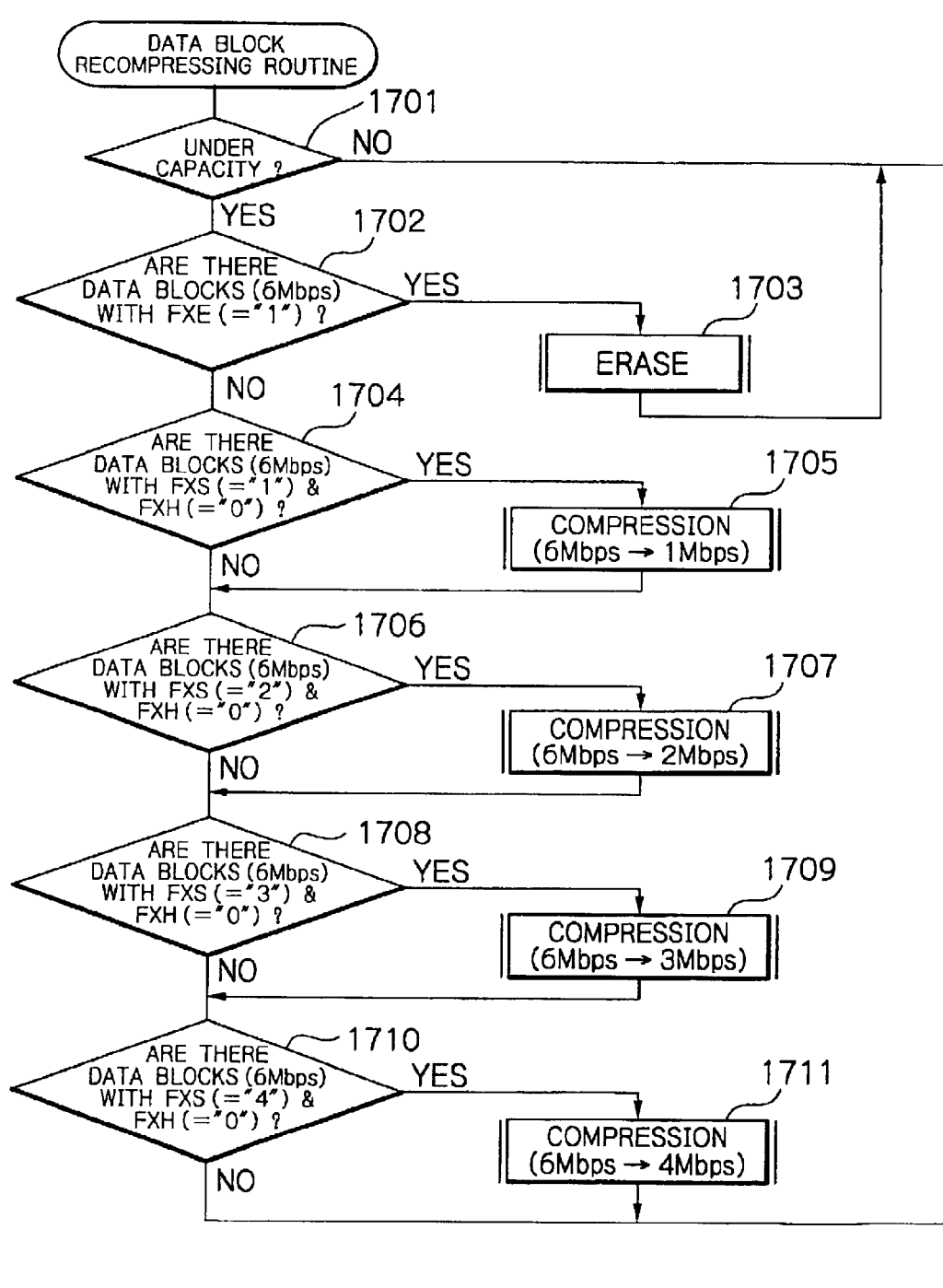
FIG. 17 is a flowchart for explaining a third recompressing operation of the control unit of FIG. 1.
Figure 17C:
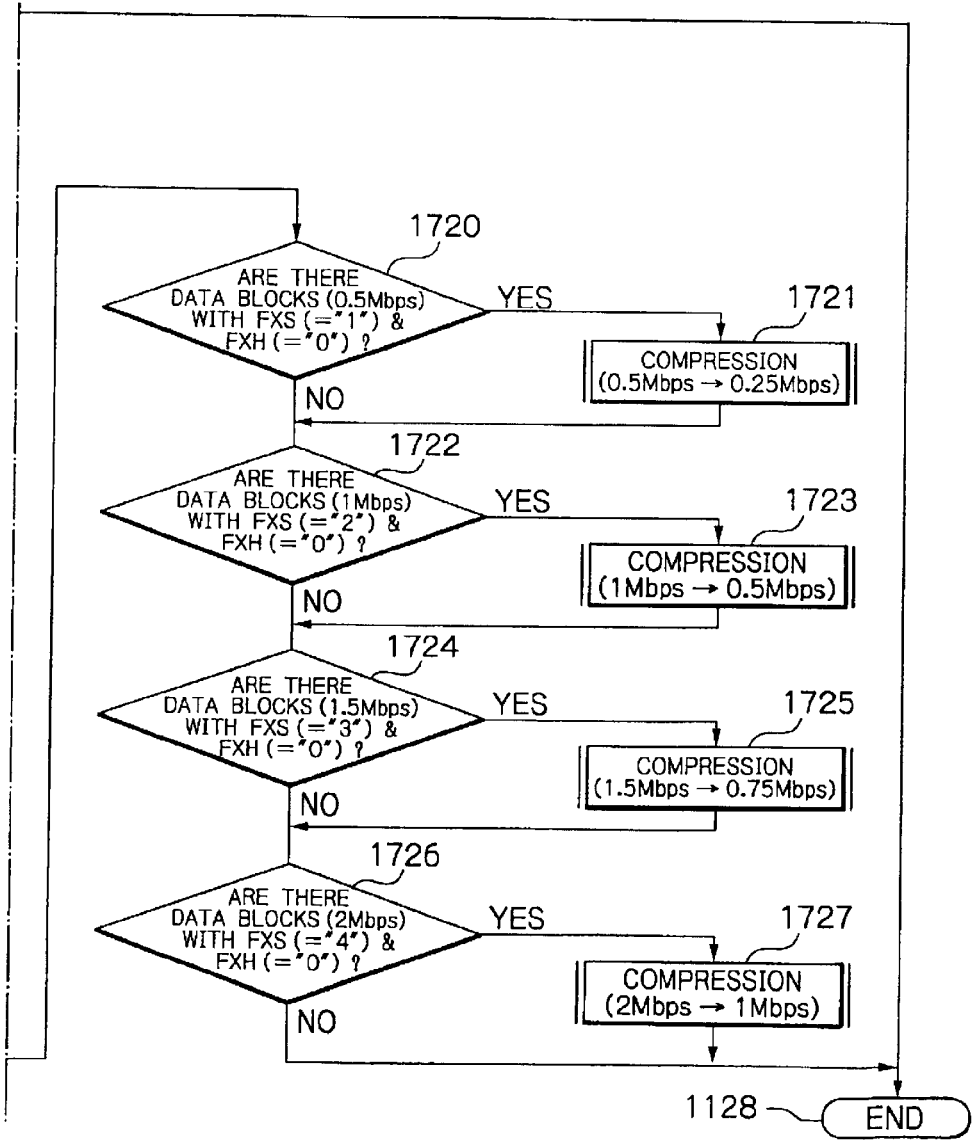

A third recompressing operation of the control unit 71 of FIG. 1 will be explained next with reference to FIGS. 17, 18A through 18C and 19A through 19C. The routine of FIG. 17 is carried out simultaneously when the routine of FIG. 16 is being carried out. Initially, assume that data blocks 31, 32, 33 and 34 which also denote the numbers thereof are already recorded with a compression bit rate R of 6 Mbps in the storage unit 3 and a data block 35 is being recorded with a compression bit rate R of 6 Mbps in the storage unit 3 as shown in FIG. 18A, and the data blocks 31, 32, 33, 34 and 35 have management data as shown in FIG. 19A. That is, the recompression permitting flags FXS of the data blocks 31, 32, 33 and 34 are "3", "1", "2" and "4", and the data block 35 has a recompressing prohibiting flag FXH(="1").

First, at step 1701, it is determined whether or not the capacity of a vacant area of the storage unit 3 is smaller than a predetermined value such as 50 MB. Only when the capacity of the vacant area of the storage unit 3 is smaller than the predetermined value, does the control proceed to step 1702. Otherwise, the control proceeds directly to step 1728. For example, at a location t1 of FIG. 18A, the control proceeds to step 1703.

At step 1702, it is determined whether or not there are data blocks (R=6 Mbps) with an erase permission flag FXE(="1"). Only when there are such data blocks, does the control proceed to step 1703 which erases such data blocks, i.e., erases the management data thereof in the management memory 74. Then, the control proceeds to step 1728. Otherwise, the control proceeds to step 1704. Note that there are no such data blocks in FIG. 18A.

At step 1704, it is determined whether or not there are data blocks (R=6 Mbps) with a recompression sequence flag FXS(="1") and a recompression prohibiting flag FXH(="0"). Only when there are such data blocks, does the control proceed to step 1705 which performs a recompressing operation upon such data blocks so that the compression bit rate R thereof is changed from 6 Mbps to 1 Mbps. Then, the control proceeds to step 1706. Note that the block 32 (R=6 Mbps) of FIG. 18A has the recompression flag FXS(="1") with FXH="0". As a result, at a location of t1, as shown in FIGS. 18B and 19B, the data block 32 is recompressed so that the compression bit rate R is changed from 6 Mbps to 1 Mbps and the sector numbers NS are decreased to expand the vacant area of the storage unit 3 as indicated by X1 in FIG. 18B.

At step 1706, it is determined whether or not there are data blocks (R=6 Mbps) with a recompression sequence flag FXS(="2") and a recompression prohibiting flag FXH(="0"). Only when there are such data blocks, does the control proceed to step 1707 which performs a recompressing operation upon such data blocks so that the compression bit rate R thereof is changed from 6 Mbps to 2 Mbps. Then, the control proceeds to step 1708. Note that the block 33 (R=6 Mbps) of FIG. 18A has the recompression flag FXS(="2") with FXH="0". As a result, at the location of t1, as shown in FIGS. 18B and 19B, the data block 33 is recompressed so that the compression bit rate R is changed from 6 Mbps to 2 Mbps and the sector numbers NS are decreased to expand the vacant area of the storage unit 3 as indicated by X2 in FIG. 18B.

At step 1708, it is determined whether or not there are data blocks (R=6 Mbps) with a recompression sequence flag FXS(="3") and a recompression prohibiting flag FXH(="0"). Only when there are such data blocks, does the control proceed to step 1709 which performs a recompressing operation upon such data blocks so that the compression bit rate R thereof is changed from 6 Mbps to 3 Mbps. Then, the control proceeds to step 1710. Note that the block 31 (R=6 Mbps) of FIG. 18A has the recompression flag FXS(="3") with FXH="0". As a result, at the location of t1, as shown in FIGS. 18B and 19B, the data block 31 is recompressed so that the compression bit rate R is changed from 6 Mbps to 3 Mbps and the sector numbers NS are decreased to expand the vacant area of the storage unit 3 as indicated by X3 in FIG. 18B.

At step 1710, it is determined whether or not there are data blocks (R=6 Mbps) with a recompression sequence flag FXS(="4") and a recompression prohibiting flag FXH (="0"). Only when there are such data blocks, does the control proceed to step 1711 which performs a recompressing operation upon such data blocks so that the compression bit rate R thereof is changed from 6 Mbps to 3 Mbps. Then, the control proceeds to step 1712. Note that the block 34 (R=6 Mbps) of FIG. 18A has the recompression flag FXS (="4") with FXH="0". As a result, at the location of t1, as shown in FIGS. 18B and 19B, the data block 34 is recompressed so that the compression bit rate R is changed from 6 Mbps to 4 Mbps and the sector numbers NS are decreased to expand the vacant area of the storage unit 3 as indicated by X4 in FIG. 18B.

Therefore, when the recording operation for the data block 35 continues, data of the data block 35 is also recorded with recompression bit rates R of 1 Mbps, 2 Mbps, 3 Mbps and 4 Mbps in the vacant areas X1, X2, X3 and X4, respectively, as shown in FIG. 18C. In this case, "351", "352", "353" and "354" are allocated as data block number N to the data block 35 recorded in the vacant area X1, X2, X3 and X4 as shown in FIG. 18C.

Thus, all the data blocks 31, 32, 33, 34, 35, 351, 352, 353 and 354 are recorded with the compression bit rate R of 3 Mbps, 1 Mbps, 2 Mbps, 4 Mbps, 6 Mbps, 6 Mbps, 6 Mbps, 6 Mbps and 6 Mbps, respectively, in the storage unit 3.

In the above-mentioned state, if another data block is expected to be recorded in the storage unit 3 so that the capacity of a vacant area of the storage unit 3 is smaller than the predetermined value, the control proceeds to steps 1712 through 1719, so that the data blocks recorded in the storage unit 3 are recompressed so that the compression bit rate R is changed from 1 Mbps, 2 Mbps, 3 Mbps and 4 Mbps to 0.5 Mbps, 1 Mbps, 1.5 Mbps and 2 Mbps, respectively, and the sector number NS are decreased to expand the vacant area of the storage unit 3. Thus, the other data block is recorded in the storage unit 3 by using this expanded vacant area of the storage unit 3.

In the above-mentioned state, if a further data block is expected to be recorded in the storage unit 3 so that the capacity of a vacant area of the storage unit 3 is smaller than the predetermined value, the control proceeds to steps 1720 through 1727 so that the data blocks recorded in the storage unit 3 are recompressed so that the compression bit rate R is changed from 0.5 Mbps, 1 Mbps, 1.5 Mbps and 2 Mbps to 0.25 Mbps, 0.5 Mbps, 0.75 Mbps and 1 Mbps, respectively, and the sector number NS are decreased to expand the vacant area of the storage unit 3. Thus, the further data block is also recorded in the storage unit 3 by using this expanded vacant area of the storage unit 3.

In the third operation as illustrated in FIGS. 14, 15, 16, 17, 18A through 18C and 19A through 19C, although the compression bit rates are 1 Mbps, 2 Mbps, 3 Mbps and 4 Mbps(first time), 0.5 Mbps, 1 Mbps, 1.5 Mbps and 2 Mbps(second time), 0.25 Mbps, 0.5 Mbps, 0.75 Mbps and 1 Mbps (third time), the compression bit rates can be other values.

A fourth operation of the control unit 71 will be explained next with reference to FIGS. 20, 21, 22, 23, 24 through 24F and 25A through 25F. Note that the fourth operation of the control unit 71 can be obtained by combining the second operation of the control unit 71 with the third operation of the control unit 71.

In FIG. 20, which shows a table stored in the management memory 74 for storing management data for one data block, this table is the same as that of FIG. 8.

The recompression sequence flag FXS, the recompression prohibiting flag FXH and the erase permitting flag FXE of FIG. 20 are calculated in accordance with the priority level of the data block as shown in FIG. 21 which is the same as that of FIG. 9. This will be explained in detail later.

A fourth recording operation of the control unit 71 of FIG. 1 will be explained next with reference to FIG. 22. The routine of FIG. 22 is carried out every time when one data block is stored in the input data memory 72.

First, at step 2201, the control unit 71 calculates management data for the data block which is supplied to the recording data processing unit 1 and the input data memory 72. That is, a data block number N, a start sector address ADD, a number NS, a compression bit rate R, a recompression sequence flag FXS, a recompression prohibiting flag FXH and an erase permitting flag FXE are calculated in accordance with the amount of the data block, the electronic program guide (EPG) information of the data block, the type of the data block and the like.

Next, at step 2202, the control unit 71 operates the recording executing unit 2 in accordance with the management data calculated at step 2201, thus recording the data block in the storage unit 3.

Figure 22:
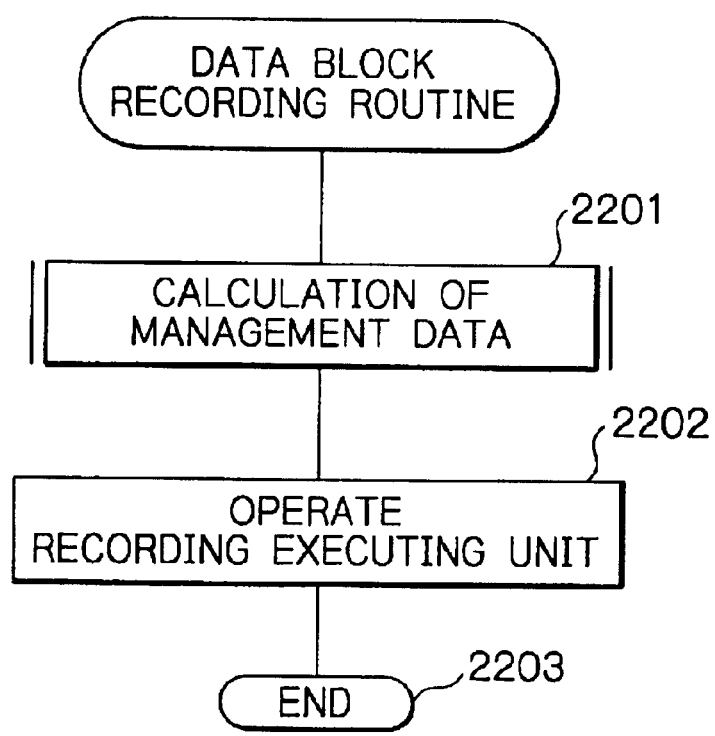
FIG. 22 is a flowchart for explaining a fourth recording operation of the control unit of FIG. 1.

Then, the routine of FIG. 22 is completed by step 2203.

Figure 23A:
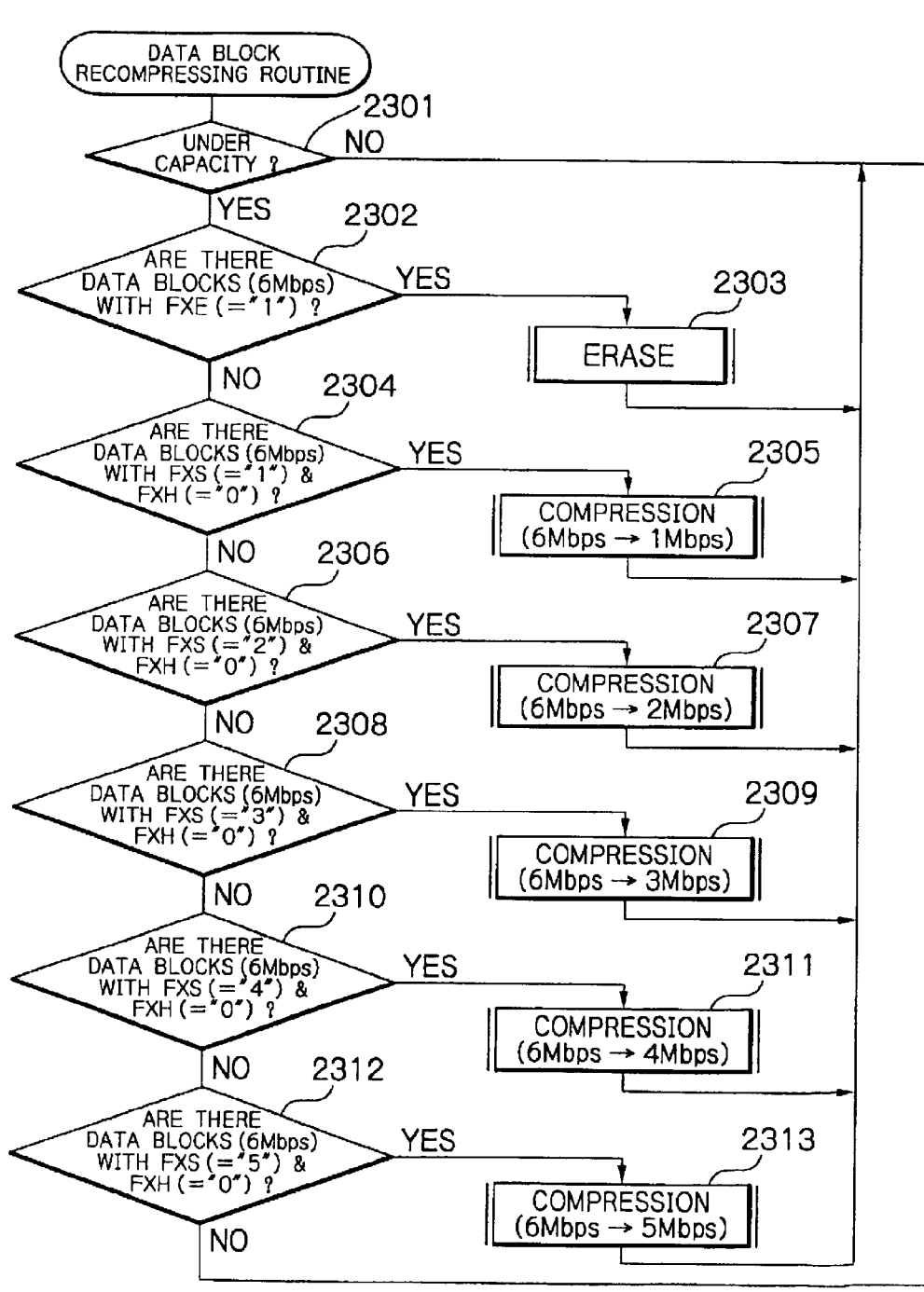
FIG. 23 is a flowchart for explaining a fourth recompressing operation of the control unit of FIG. 1.
Figure 23B:
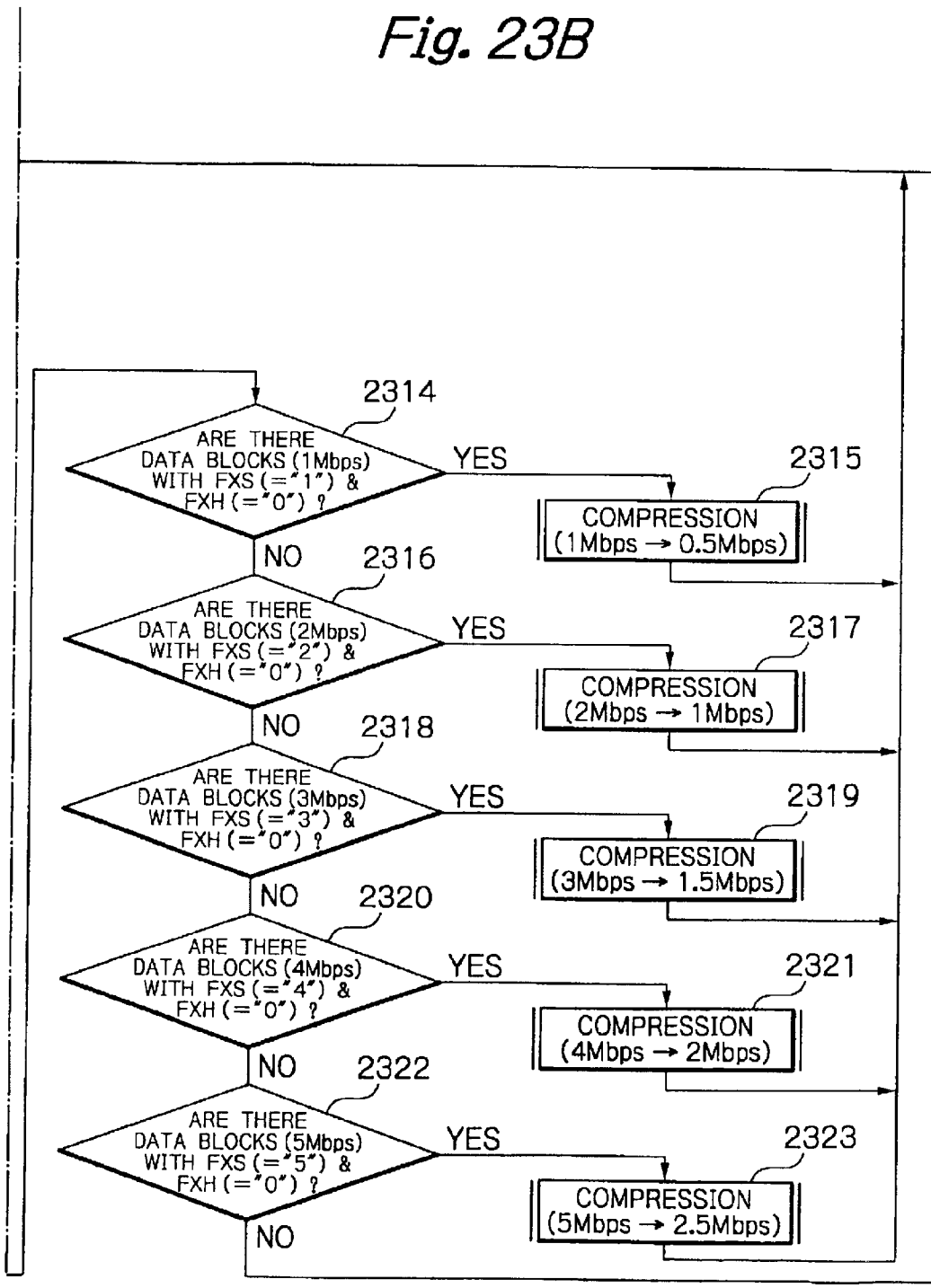
Figure 23C:
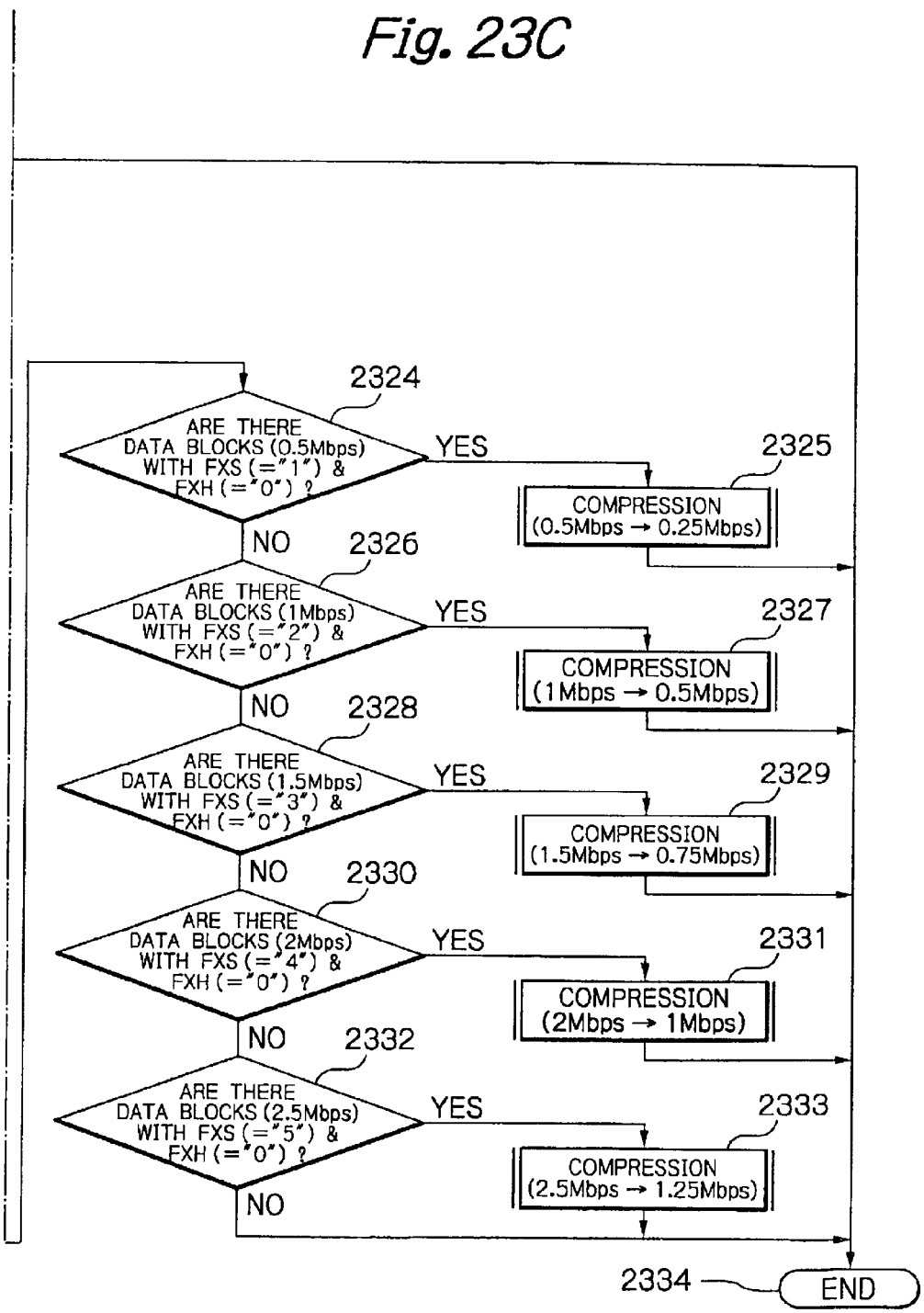

A fourth recompressing operation of the control unit 71 of FIG. 1 will be explained next with reference to FIGS. 23, 24A through 25F and 25A through 25F. The routine of FIG. 23 is carried out simultaneously when the routine of FIG. 22 is being carried out. Initially, assume that data blocks 41, 42, 43 and 44 which also denote the numbers thereof are already recorded with a compression bit rate R of 6 Mbps in the storage unit 3 and a data block 45 is being recorded with a compression bit rate R of 6 Mbps in the storage unit 3 as shown in FIG. 24A, and the data blocks 41, 42, 43, 44 and 45 have management data as shown in FIG. 25A. That is, the recompression permitting flags FXS of the data blocks 41, 42, 43, 44 and 45 are "3", "1", "2", "4" and "5", respectively.

First, at step 2301, it is determined whether or not the capacity of a vacant area of the storage unit 3 is smaller than a predetermined value such as 50 MB. Only when the capacity of the vacant area of the storage unit 3 is smaller than the predetermined value, does the control proceed to step 2302. Otherwise, the control proceeds directly to step 2334. For example, at a location t1 of FIG. 24A, the control proceeds to step 2302.

At step 2302, it is determined whether or not there are data blocks (R=6 Mbps) with an erase permission flag FXE(="1"). Only when there are such data blocks, does the control proceed to step 3303 which erases such data blocks, i.e., erases the management data thereof in the management memory 74. Then, the control proceeds to step 2334. Otherwise, the control proceeds to step 2304. Note that there are no such data blocks in FIG. 24A.

At step 2304, it is determined whether or not there are data blocks (R=6 Mbps) with a recompression sequence flag FXS(="1") and a recompression prohibiting flag FXH(="0"). Only when there are such data blocks, does the control proceed to step 2305 which performs a recompressing operation upon such data blocks so that the compression bit rate R thereof is changed from 6 Mbps to 1 Mbps. Then, the control proceeds to step 2334. Otherwise, the control proceeds to step 1106. Note that the block 42 (R=6 Mbps) of FIG. 24A has the recompression flag FXS(="1") with FXH="0". As a result, at a location of t1, as shown in FIGS. 24B and 25B, the data block 42 is recompressed so that the compression bit rate R is changed from 6 Mbps to 1 Mbps and the sector numbers NS are decreased to expand the vacant area of the storage unit 3 as indicated by X1 in FIG. 24B. Therefore, when the recording operation for the data block 45 continues, data of the data block 45 is also recorded with a recompression bit rate R of 5 Mbps in the vacant area X1 as shown in FIG. 24B. In this case, "451" is allocated as data block number N to the data block 45 recorded in the vacant area X1 as shown in FIG. 25B.

At step 2306, it is determined whether or not there are data blocks (R=6 Mbps) with a recompression sequence flag FXS(="2") and a recompression prohibiting flag FXH(="0"). Only when there are such data blocks, does the control proceed to step 2307 which performs a recompressing operation upon such data blocks so that the compression bit rate R thereof is changed from 6 Mbps to 2 Mbps. Then, the control proceeds to step 2334. Otherwise, the control proceeds to step 2308. Note that the block 43 (R=6 Mbps) of FIG. 24B has the recompression flag FXS(="2") with FXH="0". As a result, at a location of t2, as shown in FIGS. 24C and 25C, the data block 43 is recompressed so that the compression bit rate R is changed from 6 Mbps to 2 Mbps and the sector numbers NS are decreased to expand the vacant area of the storage unit 3 as indicated by X2 in FIG. 24C. Therefore, when the recording operation for the data block 45 continues, data of the data block 45 is also recorded with a recompression bit rate R of 5 Mbps in the vacant area X2 as shown in FIG. 24C. In this case, "452" is allocated as data block number N to the data block 45 recorded in the vacant area X2 as shown in FIG. 25C.

At step 2308, it is determined whether or not there are data blocks (R=6 Mbps) with a recompression sequence flag FXS(="3") and a recompression prohibiting flag FXH(="0"). Only when there are such data blocks, does the control proceed to step 2309 which performs a recompressing operation upon such data blocks so that the compression bit rate R thereof is changed from 6 Mbps to 3 Mbps. Then, the control proceeds to step 2334. Otherwise, the control proceeds to step 2310. Note that the block 41 (R=6 Mbps) of FIG. 24C has the recompression flag FXS(="3") with FXH="0". As a result, at a location of t3, as shown in FIGS. 24D and 25D, the data block 42 is recompressed so that the compression bit rate R is changed from 6 Mbps to 3 Mbps and the sector numbers NS are decreased to expand the vacant area of the storage unit 3 as indicated by X3 in FIG. 24D. Therefore, when the recording operation for the data block 45 continues, data of the data block 45 is also recorded with a recompression bit rate R of 5 Mbps in the vacant area X3 as shown in FIG. 24D. In this case, "453" is allocated as data block number N to the data block 45 recorded in the vacant area X3 as shown in FIG. 25D.

At step 2310 it is determined whether or not there are data blocks (R=6 Mbps) with a recompression sequence flag FXS(="4") and a recompression prohibiting flag FXH(="0"). Only when there are such data blocks, does the control proceed to step 2311 which performs a recompressing operation upon such data blocks so that the compression bit rate R thereof is changed from 6 Mbps to 4 Mbps. Then, the control proceeds to step 2334. Otherwise, the control proceeds to step 2312. Note that the block 24 (R=6 Mbps) of FIG. 24D has the recompression flag FXS(="4") with FXH="0". As a result, at a location of t4, as shown in FIGS. 24E and 24E, the data block 44 is recompressed so that the compression bit rate R is changed from 6 Mbps to 4 Mbps and the sector numbers NS are decreased to expand the vacant area of the storage unit 3 as indicated by X4. Therefore, when the recording operation for the data block 45 continues, data of the data block 45 is also recorded with a recompression bit rate R of 5 Mbps in the vacant area X4 as shown in FIG. 24E. In this case, "454" is allocated as data block number N to the data block 45 recorded in the vacant area X4 as shown in FIG. 25E.

At step 2512, it is determined whether or not there are data blocks (R=6 Mbps) with a recompression sequence flag FXS(="5") and a recompression prohibiting flag FXH(="0"). Only when there are such data blocks, does the control proceed to step 2513 which performs a recompressing operation upon such data blocks so that the compression bit rate R thereof is changed from 6 Mbps to 5 Mbps. Then, the control proceeds to step 2334. Otherwise, the control proceeds to step 2314. Note that the block 45 (R=6 Mbps) of FIG. 24E has the recompression flag FXS(="5") with FXH="0". As a result, at a location of t5, as shown in FIGS. 24F and 24F, the data block 45 is recompressed so that the compression bit rate R is changed from 6 Mbps to 5 Mbps and the sector numbers NS are decreased to expand the vacant area of the storage unit 3 as indicated by X5 in FIG. 24F. Therefore, when the recording operation for the data block 45 continues, data of the data block 45 is also recorded with a recompression bit rate R of 5 Mbps in the vacant area X5 as shown in FIG. 24F. In this case, "455" is allocated as data block number N to the data block 45 recorded in the vacant area X5 as shown in FIG. 25F.

Thus, all the data blocks 41, 42, 43, 44, 45, 451, 452, 453, 454 and 455 are recorded with the compression bit rate R of 3 Mbps, 1 Mbps, 2 Mbps, 4 Mbps, 5 Mbps, 5 Mbps, 5 Mbps, 5 Mbps, 5 Mbps and 5 Mbps, respectively, in the storage unit 3.

In the above-mentioned state, if another data block is expected to be recorded in the storage unit 3 so that the capacity of a vacant area of the storage unit 3 is smaller than the predetermined value, the control proceeds to steps 2314 through 2323, so that the data blocks recorded in the storage unit 3 are recompressed so that the compression bit rate R is changed from 1 Mbps, 2 Mbps, 3 Mbps, 4 Mbps and 5 Mbps to 0.5 Mbps, 1 Mbps, 1.5 Mbps, 2 Mbps and 2.5 Mbps, respectively, and the sector number NS are decreased to expand the vacant area of the storage unit 3. Thus, the other data block is recorded in the storage unit 3 by using this expanded vacant area of the storage unit 3.

In the above-mentioned state, if a further data block is expected to be recorded in the storage unit 3 so that the capacity of a vacant area of the storage unit 3 is smaller than the predetermined value, the control proceeds to steps 2324 through 2333, so that the data blocks recorded in the storage unit 3 are recompressed so that the compression bit rate R is changed from 0.5 Mbps, 1 Mbps, 1.5 Mbps, 2 Mbps and 2.5 Mbps to 0.25 Mbps, 0.5 Mbps, 0.75 Mbps, and 1.25 Mbps, respectively, and the sector number NS are decreased to expand the vacant area of the storage unit 3. Thus, the further data block is also recorded in the storage unit 3 by using this expanded vacant area of the storage unit 3.

In the fourth operation as illustrated in FIGS. 20, 21, 22, 23, 24A through 24F and 25A through 25F, although the compression bit rates are 1 Mbps, 2 Mbps, 3 Mbps, 4 Mbps and 5 Mbps(first time), 0.5 Mbps, 1 Mbps, 1.5 Mbps, 2 Mbps and 2.5 Mbps(second time), 0.25 Mbps, 0.5 Mbps, 0.75 Mbps, 1 Mbps and 1.25 Mbps (third time), the compression bit rates can be other values.

In the above-described first, second, third and fourth operation of the control unit 71, each of the recompressed data blocks are recorded in the previous positions of the storage unit 3, since the start sector addresses ADD thereof are unchanged. However, the recompressed data blocks can be recorded in a vacant area of by changing the start sector addresses ADD. For example, the change of the start sector addresses ADD of the recompressed data blocks is applied to the first operation, FIGS. 6A through 6E can be changed to FIGS. 26A through 26E. That is, as shown in FIGS. 26A and 26B, the data blocks 12 and 13 are recompressed so that the compression bit rate R is changed from 6 Mbps to 3 Mbps, and simultaneously, the start sector addresses ADD are changed. As a result, a continuous vacant area of the storage unit 3 as indicated by X1 is generated. Also, as shown in FIGS. 26C and 26D, the data blocks 11 and 14 are recompressed so that the compression bit rate R is changed from 6 Mbps to 3 Mbps, and simultaneously, the start sector addresses ADD are changed. As a result, vacant areas of the storage unit 3 as indicated by X2 and X3 are generated.

Thus, in FIGS. 26A through 26E, a continuous vacant area may be generated in the storage unit 3, which would decrease the number of recorded data blocks.

Also, in the above-described first, second, third and fourth operations of the control unit 71, three-channel operations, i.e., a data block recording operation, a data block recompressing operation and a data block reproducing operation are simultaneously carried out, which would increase the load of the storage management unit 7. Note that the data block reproducing operation per se is not discussed in the specification.

A fifth operation of the control unit 71 will be explained with reference to FIGS. 27, 28, 29, 30, 31A through 31E and 32A through 33E. In the fifth operation, although the data block recording operation is complex, the data block recompressing operation is simplified, which would decrease the load of the storage management unit 7.

In FIG. 27, which shows a table stored in the management memory 74 for storing management data for one data block, the table is the same as that of FIG. 2.

The recompression permitting flag FXM, the recompression prohibiting flag FXH and the erase permitting flag FXE of FIG. 27 are calculated in accordance with the priority level of the data block as shown in FIG. 28 which is the same as that of FIG. 3. This will be explained in detail later.

A fifth recording operation of the control unit 71 of FIG. 1 will be explained next with reference to FIG. 29. The routine of FIG. 29 is carried out every time when one data block is stored in the input data memory 72.

First, at step 2901, the control unit 71 calculates two kinds of management data for the data block which is supplied to the recording data processing unit 1 and the input data memory 72. That is, two data block numbers N, two start sector addresses ADD, two numbers NS, two compression bit rates R, two recompression permitting flags FXM, two recompression prohibiting flags FXH and two erase permitting flags FXE are calculated in accordance with the amount of the data block, the electronic program guide (EPG) information of the data block, the type of the data block and the like. For example, as shown in FIGS. 31A and 32A, two block numbers 511 and 512, two compression bit rates 6 Mbps and 3 Mbps and the like are calculated for the same data block.

Next, at step 2902, the control unit 71 operates the recording executing unit 2 in accordance with the management data calculated at step 2901, thus recording the data block in the storage unit 3.

Figure 29:
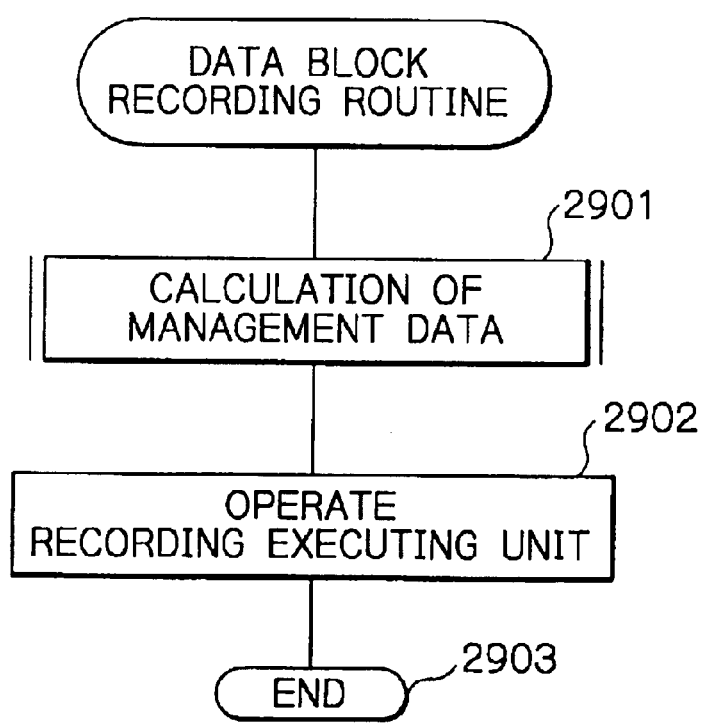
FIG. 29 is a flowchart for explaining a fifth recording operation of the control unit of FIG. 1.

Then, the routine of FIG. 29 is completed by step 2903.

Figure 30:
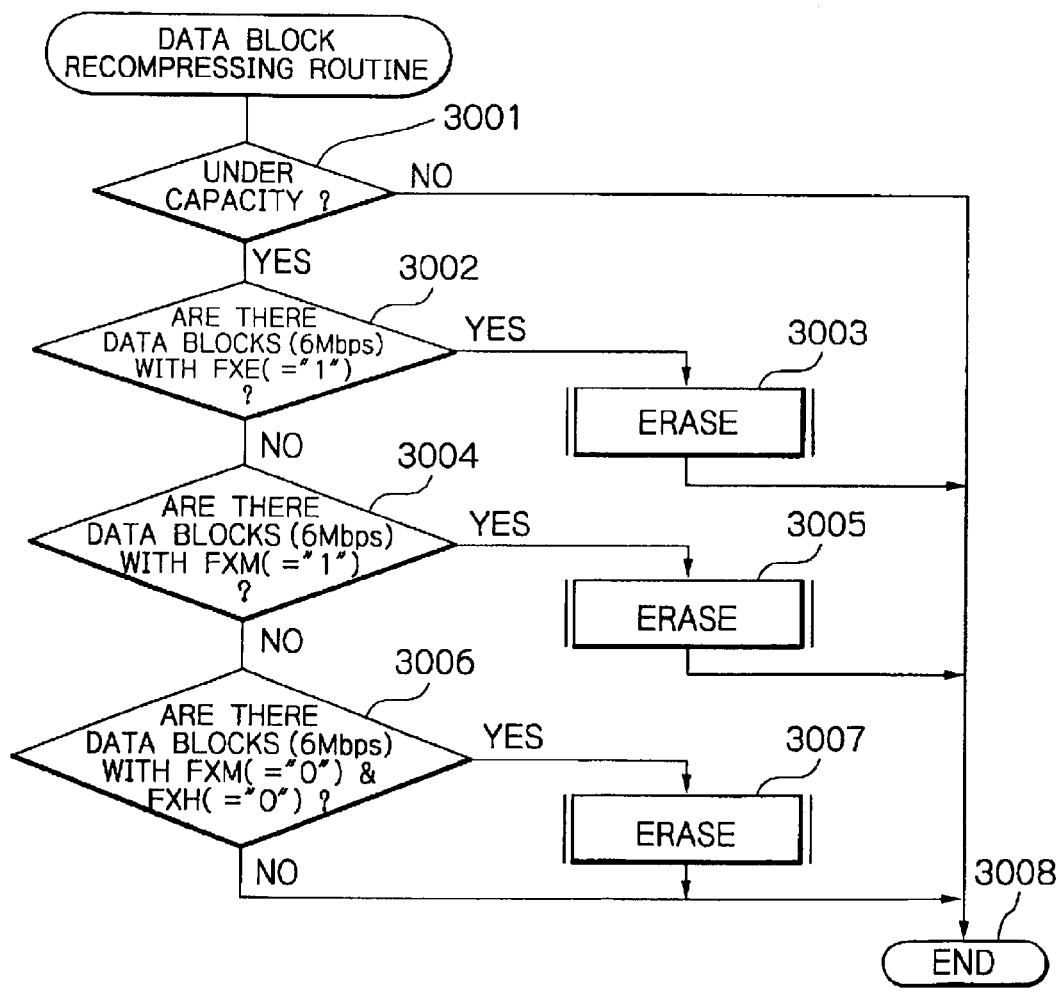
FIG. 30 is a flowchart for explaining a fifth recompressing operation of the control unit of FIG. 1.

A fifth recompressing operation of the control unit 71 of FIG. 1 will be explained next with reference to FIGS. 30, 31A through 31E and 32A through 32E. The routine of FIG. 30 is carried out simultaneously when the routine of FIG. 29 is being carried out. Initially, as shown in FIGS. 31A and 32A, assume that data blocks 511, 521 and 531 which also denotes the numbers thereof are already recorded with a compression bit rate R of 6 Mbps in the storage unit 3 and a data blocks 541 is being recorded with a compression bit rate R of 6 Mbits in the storage unit 3. Also, assume that data blocks 512, 522 and 532 which also denotes the numbers thereof are already recorded with a compression bit rate R of 3 Mbps in the storage unit 3 and a data blocks 542 is being recorded with a compression bit rate R of 3 Mbits in the storage unit 3. In this case, the contents of the data blocks 511, 521, 531 and 541 are the same as that of the data blocks 512, 522, 532 and 542, respectively. Further, the recompression permitting flag FXM(="1") is allocated to the data blocks 521 and 531, and the recompression prohibiting flag FXH(="1") is allocated to the data blocks 512, 522, 532 and 542.

First, at step 3001, it is determined whether or not the capacity of a vacant area of the storage unit 3 is smaller than a predetermined value such as 25 MB. Only when the capacity of the vacant area of the storage unit 3 is smaller than the predetermined value, does the control proceed to step 3002. Otherwise, the control proceeds directly to step 3008. For example, at a location t1 of FIG. 31A, the control proceeds to step 3002.

At step 3002, it is determined whether or not there are data blocks (R=6 Mbps) with an erase permission flag FXE(="1"). Only when there are such data blocks, does the control proceed to step 3003 which erases such data blocks, i.e., erases the management data thereof in the management memory 74. Then, the control proceeds to step 3008. Otherwise, the control proceeds to step 3004. Note that there are no such data blocks in FIG. 31A.

At step 3004, it is determined whether or not there are data blocks (R=6 Mbps) with a recompression permitting flag FXM(="1"). Only when there are such data blocks, does the control proceed to step 3005 which erases such data blocks. Then, the control proceeds to step 3008. Otherwise, the control proceeds to step 3006. Note that the blocks 521 and 531 (R=6 Mbps) of FIG. 31A have the recompression flag FXM(="1"). As a result, as shown in FIGS. 31B and 32B, the data blocks 521 and 531 are erased to expand the vacant area of the storage unit 3 as indicated by X1 in FIG. 31B. Therefore, when the recording operation for the data block 541 continues, data of the data block 541 is also recorded with a recompression bit rate R of 6 Mbps in the vacant area X1 as shown in FIG. 31C. In this case, "543" is allocated as a data block number N to the data block 541 recorded in the vacant area X1 as shown in FIG. 31C.

At step 3006, it is determined whether or not there are data blocks (R=6 Mbps) with a recompression permitting flag FXM(="0") and a recompression prohibiting flag FXH(="0"). Only when there are such data blocks, does the control proceed to step 3007 which erases such data blocks. Then, the control proceeds to step 3008. Note that the blocks 511 and 541 (R=6 Mbps) of FIG. 31C have the recompression flag FXM(="0") and the recompression flag FXH(="0"). As a result, at a location of t2 of FIG. 6C, as shown in FIGS. 31D and 32D, the data blocks 511 and 541 are erased to expand the vacant area of the storage unit 3 as indicated by X2 and X3 in FIG. 31D. Therefore, when the recording operation for the data block 543 continues, data of the data block 543 is also recorded with a recompression bit rate R of 6 Mbps in the vacant areas X2 and X3 as shown in FIG. 31E. In this case, "544" and "545" are allocated as data block numbers N to the data block 543 recorded in the vacant areas X2 and X3 as shown in FIG. 31E.

In the fifth operation as illustrated in FIGS. 27, 28, 29, 30, 31A through 31E and 32A through 32E, although the compression bit rates are 6 Mbps and 3 Mbps, the compression bit rates can be other values.

In the above-described embodiment, a recompressing operation is substantially started when the vacant area of the storage unit 3 becomes smaller than a predetermined value such as 50 MB or 25MB. However, the predetermined value can be a predetermined ratio of the entire capacity of the storage unit 3 such as 5% or 10/a. Also, when a possible recording time for the vacant area of the storage unit 3 becomes smaller than a predetermined value, a recompressing operation can be started. Further, when a currently-recorded television show or a reserved television show is expected to overflow the vacant area of the storage unit 3, a recompressing operation can be started. In this case, when such a television show is reserved every day or every week, a recompressing operation can be skipped.

The priority level of a data block as shown in FIGS. 3, 9, 15, 21 and 28 will be explained below.

For example,

Priority level 1: News, Weather forecast;

Priority level 2: Sports program;

Priority level 3: Movie;

Priority level 4: Music program; and

Priority level 5: Drama.

The above-mentioned priority levels 1, 2, 3, 4 and 5 can be determined by reading the electronic program guide (EPG) information or the character information.

Also, the priority levels can be determined in accordance with the user's preference determined by a formula:

$$A \cdot T1 + B \cdot T2$$

where T1 is a recording time;

T2 is a reproducing time; and

A, B are constants.

Further, the priority levels can be determined in accordance with the information amount of each data block which is calculated under the moving picture expert group (MPEG) compressing method by $$\sum_i Pi = \sum_i \left( \sum_j MB_j \right)_i$$

$$= \sum_i \sum_j \sum_k (B_k \cdot QSV)$$

where $P_i$ is the information amount of each picture;

$MB_j$ is the information amount of a macro block;

$B_k$ is the number of bits in each macro block; and

QSV is a quantized scale value designated by a quantized scale code (QSC). For example, if $B_k$ is 20bits, QSV is 10, $$MB_j = 20 \times 10$$
$$= 200$$

The value $MB_j$ is defined as an "X value" in MPEG specification.

On the other hand, the information amount of each data block can be obtained from luminance signals $P_{mn}$. That is, as shown in FIG. 33 which shows one macro block $MB_j$ divided into four sub blocks $SB_1$, $SB_2$, $SB_3$ and $SB_4$, the variance value $\sigma^2$ (sub) of the luminance signals within one sub block is represented by $$\sigma^2(sub) = (1/64) \sum_m \sum_n (P_{mn} - P_{mean})^2$$

where $P_{mean}$ is the mean value of the luminance signals $P_{mn}$ within the sub block.

Then, the variance value of the luminance signals within one macro block is represented by $$\sigma_j^2 \text{ (macro)} = 1 + \min(\sigma^2 \text{ (sub)})$$

where min $\sigma^2$(sub) is a minimum value of the four values $\sigma^2$ (sub).

Then, the information amount of each data block is represented by $$\sum_i \sum_j \sigma_j^2(\text{macro})$$

Note that this value is defined as an "activity value" in MPEG specification.

Additionally, the above-mentioned priority level can be manually determined by the user.

In the above-described embodiment, the priority level defined by the flags FXM, FXS, FXH and FXE is determined when each data block is being recorded in the storage unit 3. However, the priority level can be determined after each data block is recorded in the storage unit 3.

Also, in the above-described embodiment, data block is first compressed before the recording thereof; however, the data block can be first recorded in the storage unit 3 without compressing it.

As explained hereinabove, according to the present invention, individual data blocks can be compressed (or recompressed) in accordance with the quality thereof with a minimum change of management data.

What is claimed is:

1. A data recording and reproducing method, comprising:

recording data blocks in a storage unit;

setting and storing a priority level for each of said data blocks;

determining whether a vacant area of said storage unit is expected to be short; and recompressing said data blocks recorded in said storage unit in accordance with said stored priority levels when the vacant area of said storage unit is expected to be short, wherein each of said priority levels is represented by a recompression permitting flag and a recompression prohibiting flag, said recompressing comprising:
recompressing a first group of said data blocks having said recompression permitting flag and no recompression prohibiting flag so that a compression bit rate of the first group of said data blocks is decreased to a predetermined value; and
recompressing a second group of said data blocks having no recompression permitting flag and no recompression prohibiting flag so that a compression bit rate of the second group of said data blocks is decreased to said predetermined value after the first group of said data blocks are decreased to said predetermined value.

2. The method as set forth in claim 1, wherein each of said priority levels is further represented by an erase permitting flag,
said recompressing comprising erasing a third group of said data blocks having said erase permitting flag before the first group of said data blocks are recompressed.

3. A data recording and reproducing method, comprising:
recording data blocks in a storage unit;
setting and storing a priority level for each of said data blocks;
determining whether a vacant area of said storage unit is expected to be short; and
recompressing said data blocks recorded in said storage unit in accordance with said stored priority levels when the vacant area of said storage unit is expected to be short, wherein each of said priority levels is represented by a recompression permitting flag and a recompression prohibiting flag,
said recompressing comprising:
recompressing a first group of said data blocks with an i-th(i=1, 2, . . . ) compression bit rate having said recompression permitting flag and no recompression prohibiting flag so that the compression bit rate of the first group of said data blocks is decreased to an (i+1)-th compression bit rate; and
recompressing a second group of said data blocks with said i-th compression bit rate having no recompression permitting flag and no recompression prohibiting flag so that the compression bit rate of the second group of said data blocks is decreased to said (i+1)-th compression bit rate,
said (i+1)-th compression bit rate being smaller than said i-th compression bit rate.

4. The method as set forth in claim 3, wherein each of said priority levels is further represented by an erase permitting flag,
said recompressing comprising erasing a third group of said data blocks having said erase permitting flag before the first group of said data blocks are recompressed.

5. A data recording and reproducing method, said method comprising:
recording data blocks in a storage unit;
setting and storing priority levels for each one of said data blocks;
determining whether a vacant area of said storage unit is expected to be short; and
recompressing said data blocks recorded in said storage unit in accordance with said stored priority levels when the vacant area of said storage unit is expected to be short, wherein each of said priority levels is represented by a recompression sequence flag,
said recompressing comprising:
recompressing a group of said data blocks with a compression bit rate having a priority in accordance with said recompression sequence flag so that a compression bit rate of the group of said data blocks is decreased to a lower compression bit rate than said compression bit rate.

6. The method as set forth in claim 5, wherein each of said priority levels is further represented by an erase permitting flag,
said recompressing comprising a step of erasing said data blocks having said erase permitting flag before the group of said data blocks are recompressed.

7. A data recording and reproducing method, said method comprising:
recording data blocks in a storage unit;
setting and storing priority levels for each one of said data blocks;
determining whether a vacant area of said storage unit is expected to be short; and
recompressing said data blocks recorded in said storage unit in accordance with said stored priority Levels when the vacant area of said storage unit is expected to be short, wherein each of said priority levels is represented by a recompression sequence flag,
said recompressing comprising:
recompressing a group of said data blocks with an i-th(i=1, 2, . . . ) compression bit rate having a priority in accordance with said recompression sequence flag so that the compression bit rate of the group of said data blocks is decreased to an (i+1)-th compression bit rate,
said (i+1)-th compression bit rate being smaller than said i-th compression bit rate.

8. The method as set forth in claim 7, wherein each of said priority levels is further represented by an erase permitting flag,
said recompressing comprising erasing said data blocks having said erase permitting flag before the group of said data blocks are recompressed.

9. A data recording and reproducing method, said method comprising:
recording data blocks in a storage unit;
setting and storing priority levels for each one of said data blocks;
determining whether a vacant area of said storage unit is expected to be short; and recompressing said data blocks recorded in said storage unit in accordance with said stored priority levels when the vacant area of said storage unit is expected to be short, wherein each of said priority levels is represented by a recompression sequence flag,
said recompressing comprising:
recompressing said data blocks with a compression bit rate having said recompression sequence flag in accordance with said recompression sequence flag so that compression bit rates of said data blocks are decreased to compression bit rates dependent upon a value of said recompression sequence flag.

10. The method as set forth in claim 9, wherein each of said priority levels is further represented by an erase permitting flag;

said recompressing comprising erasing said data blocks having said erase permitting flag before said data blocks having said recompression sequence flag are recompressed.

11. A data recording and reproducing method, said method comprising:

recording data blocks in a storage unit;

setting and storing priority levels for each one of said data blocks;

determining whether a vacant area of said storage unit is expected to be short; and recompressing said data blocks recorded in said storage unit in accordance with said stored priority levels when the vacant area of said storage unit is expected to be short, wherein each of said priority levels is represented by a recompression sequence flag, said recompressing comprising:

recompressing said data blocks having said recompression sequence flag in accordance with said recompression sequence flag so that compression bit rates of said data blocks are decreased to compression bit rates dependent upon a value of said recompression sequence flag.

12. The method as set forth in claim 11, wherein each of said priority levels is further represented by an erase permitting flag, said recompressing comprising erasing said data blocks having said erase permitting flag before said data blocks having said recompression sequence flag are recompressed.

13. A data recording and reproducing method, said method comprising:

recording data blocks in a storage unit;

setting and storing priority levels for each one of said data blocks;

determining whether a vacant area of said storage unit is expected to be short; and recompressing said data blocks recorded in said storage unit in accordance with said stored priority levels when the vacant area of said storage unit is expected to be short, wherein each of said priority levels is represented by a recompression sequence flag, said recompressing comprising:

recompressing a group of said data blocks with a compression bit rate having a priority in accordance with said recompression sequence flag so that a compression bit rate of the group of said data blocks is decreased to a lower compression bit rate than said compression bit rate, said lower compression bit rate depending on a value of said compression sequence flag.

14. The method as set forth in claim 13, wherein each of said priority levels is further represented by an erase permitting flag, said recompressing comprising erasing said data blocks having said erase permitting flag before the group of said data blocks are recompressed.

15. A data recording and reproducing method, said method comprising:

recording data blocks in a storage unit;

setting and storing priority levels for each one of said data blocks;

determining whether a vacant area of said storage unit is expected to be short; and recompressing said data blocks recorded in said storage unit in accordance with said stored priority levels when the vacant area of said storage unit is expected to be short, wherein each of said priority levels is represented by a recompression sequence, said recompressing comprising:

recompressing a group of said data blocks having a priority in accordance with said recompression sequence flag so that the compression bit rate of the group of said data blocks is decreased to a compression bit rate depending on a value of said compression sequence flag.

16. The method as set forth in claim 15, wherein each of said priority levels is further represented by an erase permitting flag, said recompressing comprising erasing said data blocks having said erase permitting flag before said data blocks having said recompression sequence flag are recompressed.

17. A data recording and reproducing method, comprising:

recording data blocks in a storage unit;

setting and storing a priority level for each of said data blocks;

determining whether a vacant area of said storage unit is expected to be short; and recompressing said data blocks recorded in said storage unit in accordance with said stored priority levels when the vacant area of said storage unit is expected to be short, wherein said recording records each of said data blocks as first and second data in two areas of said storage unit, said first data having a larger compression bit rate than said second data, each of said priority levels being represented by a recompression permitting flag and a recompression prohibiting flag, said recompressing comprising:

erasing the first data of a first group of said data blocks having said recompression permitting flag and no recompression prohibiting flag; and erasing the first data of a second group of said data blocks having no recompression permitting flag and no recompression prohibiting flag after the first data of the first group of said data blocks are erased.

18. The method as set forth in claim 17, wherein each of said priority levels is further represented by an erase permitting flag, said recompressing comprising erasing said data blocks having said erase permitting flag before the first data of said data blocks permitting flag is recompressed.

19. A data recording and reproducing method, comprising:

recording data blocks in a storage unit;

setting and storing a priority level for each of said data blocks;

determining whether a vacant area of said storage unit is expected to be short; and recompressing said data blocks recorded in said storage unit in accordance with said stored priority levels when the vacant area of said storage unit is expected to be short, wherein said vacant area determining determines whether or not a possible recording time of a currently-recorded data blocks for the vacant area of said storage unit is smaller than a predetermined value.

20. A data recording and reproducing method, comprising:
  recording data blocks in a storage unit;
  setting and storing a priority level for each of said data blocks;
  determining whether a vacant area of said storage unit is expected to be short; and
  recompressing said data blocks recorded in said storage unit in accordance with said stored priority levels when the vacant area of said storage unit is expected to be short wherein said vacant area determining determines whether or not a reserved data block is expected to overflow the vacant area of said storage unit.

21. A data recording and reproducing apparatus comprising:
  a storage unit;
  a recording data processing unit for performing a data recording process upon input data blocks;
  a recording executing unit, connected to said recording data processing unit and said storage unit, for recording said data blocks in said storage unit;
  a reproducing executing unit, connected to said storage unit, for reproducing said data blocks recorded in said storage unit;
  a reproduced data processing unit, connected to said reproducing executing unit, for performing a reproduced data process upon said reproduced data blocks;
  a recompressing unit, connected between said reproduced data processing unit and said recording data processing unit, for performing a recompressing operation upon said reproduced data blocks; and
  a management unit, connected to said recording executing unit, said reproducing executing unit and said recompressing unit,
  said management unit setting and storing priority levels each for one of said data blocks, determining whether a vacant area of said storage unit is expected to be short, so that said data blocks recorded in said storage unit are recompressed in accordance with said stored priority levels when the vacant area of said storage unit is expected to be short.

22. The apparatus as set forth in claim 21, wherein said recompressing data blocks are recorded in previous positions thereof in said storage unit.

23. The apparatus as set forth in claim 21, wherein said recompressing data blocks are recorded in different positions from previous positions thereof in said storage unit.

24. The apparatus as set forth in claim 21, wherein each of said priority levels is represented by a recompression permitting flag and a recompression prohibiting flag,
  said recompressing unit recompressing a first group of said data blocks having said recompression permitting flag and no recompression prohibiting flag so that a compression bit rate of the first group of said data blocks is decreased to a predetermined value, and recompressing a second group of said data blocks having no recompression permitting flag and no recompression prohibiting flag so that a compression bit rate of the second group of said data blocks is decreased to said predetermined value after the first group of said data blocks are decreased to said predetermined value.

25. The apparatus as set forth in claim 24, wherein each of said priority levels is further represented by an erase permitting flag,
  said recompressing unit comprising erasing a third group of said data blocks having said erase permitting flag before the first group of said data blocks are recompressed.

26. The apparatus as set forth in claim 21, wherein each of said priority levels is represented by a recompression permitting flag and a recompression prohibiting flag,
  said recompressing unit recompressing a first group of said data blocks with an i-th (i=1, 2, . . . ) compression bit rate having said recompression permitting flag and no recompression prohibiting flag so that the compression bit rate of the first group of said data blocks is decreased to an (i+1)-th compression bit rate, and recompressing a second group of said data blocks with said i-th compression bit rate having no recompression permitting flag and no recompression prohibiting flag so that the compression bit rate of the second group of said data blocks is decreased to said (i+1)-th compression bit rate,
  said (i+1)-th compression bit rate being smaller than said i-th compression bit rate.

27. The apparatus as set forth in claim 26, wherein each of said priority levels is further represented by an erase permitting flag,
  said recompressing unit erasing a third group of said data blocks having said erase permitting flag before the first group of said data blocks are recompressed.

28. The apparatus as set forth in claim 21, wherein each of said priority levels is represented by a recompression sequence flag,
  said recompressing unit recompressing a group of said data blocks with a compression bit rate having a priority in accordance with said recompression sequence flag so that a compression bit rate of the group of said data blocks is decreased to a lower compression bit rate than said compression bit rate.

29. The apparatus as set forth in claim 28, wherein each of said priority levels is further represented by an erase permitting flag,
  said recompressing unit erasing said data blocks having said erase permitting flag before the group of said data blocks are recompressed.

30. The apparatus as set forth in claim 21, wherein each of said priority levels is represented by a recompression sequence flag,
  said recompressing unit recompressing a group of said data blocks with an i-th (i=1, 2, . . . ) compression bit rate having a priority in accordance with said recompression sequence flag so that the compression bit rate of the group of said data blocks is decreased to an (i+1)-th compression bit rate,
  said (i+1)-th compression bit rate being smaller than said i-th compression bit rate.

31. The apparatus as set forth in claim 30, wherein each of said priority levels is further represented by an erase permitting flag,
  said recompressing unit erasing said data blocks having said erase permitting flag before the group of said data blocks are recompressed.

32. The apparatus as set forth in claim 31, wherein each of said priority levels is represented by a recompression sequence flag,
  said recompressing unit recompressing said data blocks with a compression bit rate having said recompression sequence flag in accordance with said recompression sequence flag so that compression bit rates of said data blocks are decreased to compression bit rates dependent upon a value of said recompression sequence flag.

33. The apparatus as set forth in claim 32, wherein each of said priority levels is further represented by an erase permitting flag, said recompressing unit erasing said data blocks having said erase permitting flag before said data blocks having said recompression sequence flag are recompressed.

34. The apparatus as set forth in claim 31, wherein each of said priority levels is represented by a recompression sequence flag, said recompressing unit recompressing said data blocks having said recompression sequence flag in accordance with said recompression sequence flag so that compression bit rates of said data blocks are decreased to compression bit rates dependent upon a value of said recompression sequence flag.

35. The apparatus as set forth in claim 31, wherein each of said priority levels is further represented by an erase permitting flag, said recompressing unit erasing said data blocks having said erase permitting flag before said data blocks having said recompression sequence flag are recompressed.

36. The apparatus as set forth in claim 31, wherein each of said priority levels is represented by a recompression sequence flag, said recompressing unit recompressing a group of said data blocks with a compression bit rate having a priority in accordance with said recompression sequence flag so that a compression bit rate of the group of said data blocks is decreased to a lower compression bit rate than said compression bit rate, said lower compression bit rate depending on a value of said compression sequence flag.

37. The apparatus as set forth in claim 36, wherein each of said priority levels is further represented by an erase permitting flag, said recompressing unit erasing said data blocks having said erase permitting flag before the group of said data blocks are recompressed.

38. The apparatus as set forth in claim 21, wherein each of said priority levels is represented by a recompression sequence, said recompressing unit recompressing a group of said data blocks having a priority in accordance with said recompression sequence flag so that the compression bit rate of the group of said data blocks is decreased to a compression bit rate depending on a value of said compression sequence flag.

39. The apparatus as set forth in claim 38, wherein each of said priority levels is further represented by an erase permitting flag, said recompressing unit erasing said data blocks having said erase permitting flag before said data blocks having said recompression sequence flag are recompressed.

40. The apparatus as set forth in claim 21, wherein said recording executing unit records each of said data blocks as first and second data in two areas of said storage unit, said first data having a larger compression bit rate than said second data, each of said priority levels being represented by a recompression permitting flag and a recompression prohibiting flag, said recompressing unit erasing the first data of a first group of said data blocks having said recompression permitting flag and no recompression prohibiting flag, and erasing the first data of a second group of said data blocks having no recompression permitting flag and no recompression prohibiting flag after the first data of the first group of said data blocks are erased.

41. The apparatus as set forth in claim 40, wherein each of said priority levels is further represented by an erase permitting flag, said recompressing unit erasing said data blocks having said erase permitting flag before the first data of said data blocks permitting flag is recompressed.

42. The apparatus as set forth in claim 21, wherein said management unit determines whether or not the vacant area of said storage unit is smaller than a predetermined value.

43. The apparatus as set forth in claim 21, wherein said management unit determines whether or not the vacant area of said storage unit is smaller than a predetermined ratio of the capacity of said storage unit.

44. The apparatus as set forth in claim 21, wherein said management unit determines whether or not a possible recording time of a currently-recorded data blocks for the vacant area of said storage unit is smaller than a predetermined value.

45. The apparatus as set forth in claim 21, wherein said management unit determines whether or not a currently-recorded data block is expected to overflow the vacant area of said storage unit.

46. The apparatus as set forth in claim 21, wherein said management unit determines whether or not a reserved data block is expected to overflow the vacant area of said storage unit.

47. The apparatus as set forth in claim 21, wherein said management unit sets said priority levels in accordance with the types of said data blocks.

48. The apparatus as set forth in claim 21, wherein said management unit sets said priority levels in accordance with the information amounts of said data blocks.

49. The apparatus as set forth in claim 21, wherein said management unit sets said priority levels in accordance with the user's preference for said data blocks.

50. The apparatus as set forth in claim 21, wherein said priority levels are manually set.

* * * * *